(12) United States Patent
Palin et al.

(10) Patent No.: US 9,686,676 B2
(45) Date of Patent: Jun. 20, 2017

(54) METHOD, APPARATUS, AND COMPUTER PROGRAM PRODUCT FOR A SERVER CONTROLLED DEVICE WAKEUP

(71) Applicant: Nokia Technologies, OY, Espoo (FI)

(72) Inventors: Arto Palin, Viiala (FI); Jukka Reunamaki, Tampere (FI); Niko Kiukkonen, Veikkola (FI); Teemu Savolainen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 120 days.

(21) Appl. No.: 14/598,443

(22) Filed: Jan. 16, 2015

(65) Prior Publication Data

US 2016/0212147 A1    Jul. 21, 2016

(51) Int. Cl.
| | |
|---|---|
| *H04W 12/04* | (2009.01) |
| *H04W 12/08* | (2009.01) |
| *H04W 4/02* | (2009.01) |
| *H04W 12/02* | (2009.01) |
| *H04W 12/10* | (2009.01) |
| *H04L 29/06* | (2006.01) |
| *H04W 4/00* | (2009.01) |

(52) U.S. Cl.
CPC ......... *H04W 12/04* (2013.01); *H04L 63/062* (2013.01); *H04W 4/008* (2013.01); *H04W 4/02* (2013.01); *H04W 12/02* (2013.01); *H04W 12/08* (2013.01); *H04W 12/10* (2013.01); *H04L 63/0478* (2013.01)

(58) Field of Classification Search
CPC .. H04L 63/0478; H04L 63/062; H04W 4/008; H04W 4/02; H04W 12/02; H04W 12/04; H04W 12/10; H04W 12/08
See application file for complete search history.

(56) References Cited

U.S. PATENT DOCUMENTS

| | | |
|---|---|---|
| 5,193,216 A | 3/1993 | Davis |
| 5,471,671 A | 11/1995 | Wang et al. |
| 5,732,347 A | 3/1998 | Bartle et al. |
| 7,668,954 B1 * | 2/2010 | Melvin ............. H04L 29/12839 709/224 |
| 7,669,232 B2 * | 2/2010 | Jou ......................... H04L 63/06 380/247 |
| 8,547,867 B2 | 10/2013 | Koo et al. |

(Continued)

FOREIGN PATENT DOCUMENTS

| | | |
|---|---|---|
| EP | 2015274 | 1/2009 |
| EP | 1418781 | 6/2012 |
| WO | WO2005091573 | 9/2005 |

*Primary Examiner* — Jung Kim
*Assistant Examiner* — James J Wilcox
(74) *Attorney, Agent, or Firm* — Locke Lord LLP

(57) ABSTRACT

In an example embodiment, a method includes receiving, by an apparatus, from a remote server, a message including information about at least one device, the message including a second encryption key of the at least one device and an encrypted object encrypted with a first encryption key of the at least one device; transmitting, by the apparatus, an encrypted message that includes the encrypted object, encrypted with the second encryption key of the at least one device; and receiving, by the apparatus, from the at least one device, a message identifying or describing the at least one device, only if the at least one device has determined that the message transmitted by the apparatus is valid.

7 Claims, 26 Drawing Sheets

PROCESS IN SERVER 104    330

Step 332: updating, by a server, a current location of a wireless device;

Step 334: accessing, by the server, a database to obtain data relating to available devices near the current location, the data including a first encryption key and a second encryption key of at least one device near the current location, and a user access profile of the wireless device;

Step 336: computing, by the server, an encrypted object formed by the first encryption key encrypting at least the user access profile of the wireless device; and Step 338: transmitting, by the server, to the wireless device, a message in response to the update, the message including information about the at least one device, including at least the second encryption key and the encrypted object.

(56) References Cited

U.S. PATENT DOCUMENTS

| | | | |
|---|---|---|---|
| 8,964,220 B2* | 2/2015 | Chang | G06F 3/1245 358/1.13 |
| 9,158,395 B2 | 10/2015 | Park et al. | |
| 2004/0042413 A1 | 3/2004 | Kawamura et al. | |
| 2004/0215816 A1 | 10/2004 | Hayes et al. | |
| 2005/0278646 A1 | 12/2005 | Liscano et al. | |
| 2006/0258338 A1 | 11/2006 | Markki et al. | |
| 2006/0267794 A1 | 11/2006 | Lee et al. | |
| 2008/0013502 A1 | 1/2008 | Clark | |
| 2008/0107054 A1 | 5/2008 | Parts et al. | |
| 2008/0161026 A1 | 7/2008 | Wiatrowski et al. | |
| 2009/0320098 A1 | 12/2009 | Roberts et al. | |
| 2010/0035567 A1 | 2/2010 | Vin | |
| 2010/0105409 A1 | 4/2010 | Agarwal et al. | |
| 2010/0118736 A1 | 5/2010 | Chung et al. | |
| 2010/0244587 A1 | 9/2010 | Tiovola et al. | |
| 2011/0022661 A1 | 1/2011 | Alsina | |
| 2011/0066850 A1 | 3/2011 | Ekberg | |
| 2011/0281519 A1 | 11/2011 | Reuss et al. | |
| 2011/0317834 A1* | 12/2011 | Chaturvedi | H04L 63/061 380/255 |
| 2011/0319022 A1 | 12/2011 | Arad et al. | |
| 2012/0289157 A1 | 11/2012 | Palin et al. | |
| 2012/0289158 A1 | 11/2012 | Palin et al. | |
| 2012/0289160 A1 | 11/2012 | Palin et al. | |
| 2013/0065584 A1 | 3/2013 | Lyon et al. | |
| 2013/0138786 A1 | 5/2013 | Ji et al. | |
| 2013/0260688 A1 | 10/2013 | Palin et al. | |
| 2014/0282877 A1* | 9/2014 | Mahaffey | H04L 63/0853 726/3 |
| 2014/0380159 A1 | 12/2014 | Reilly et al. | |
| 2015/0135087 A1 | 5/2015 | Verkasalo | |
| 2015/0193198 A1 | 7/2015 | Hutchings et al. | |
| 2015/0256954 A1 | 9/2015 | Carlsson et al. | |
| 2015/0296377 A1* | 10/2015 | Sheu | H04L 63/0869 380/279 |
| 2015/0304209 A1 | 10/2015 | Choudhury et al. | |
| 2015/0341876 A1 | 11/2015 | Abraham et al. | |
| 2015/0373083 A1 | 12/2015 | Geurts et al. | |
| 2016/0072573 A1 | 3/2016 | Tohzaka et al. | |
| 2016/0212194 A1* | 7/2016 | Palin | G06F 3/0484 |

* cited by examiner

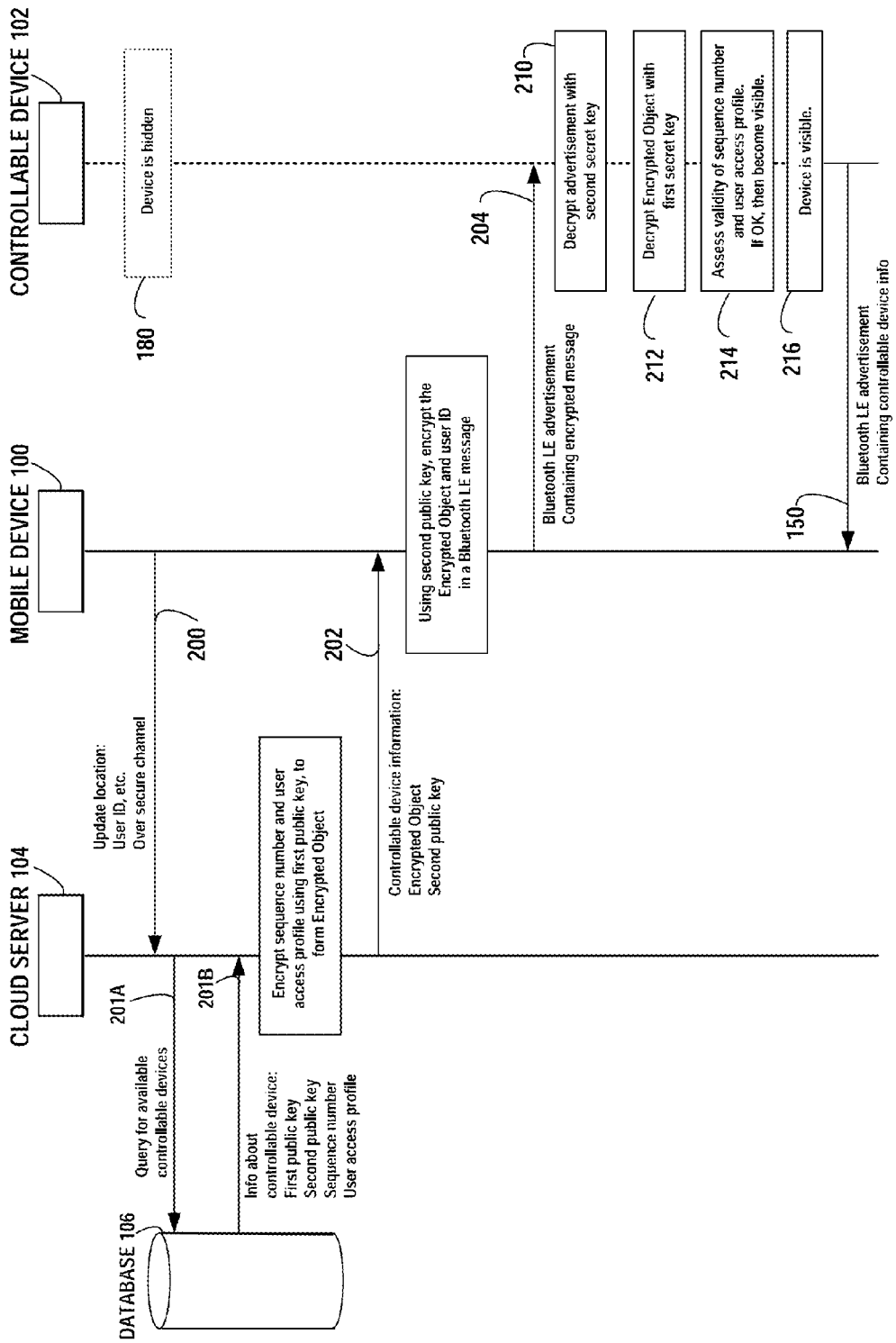

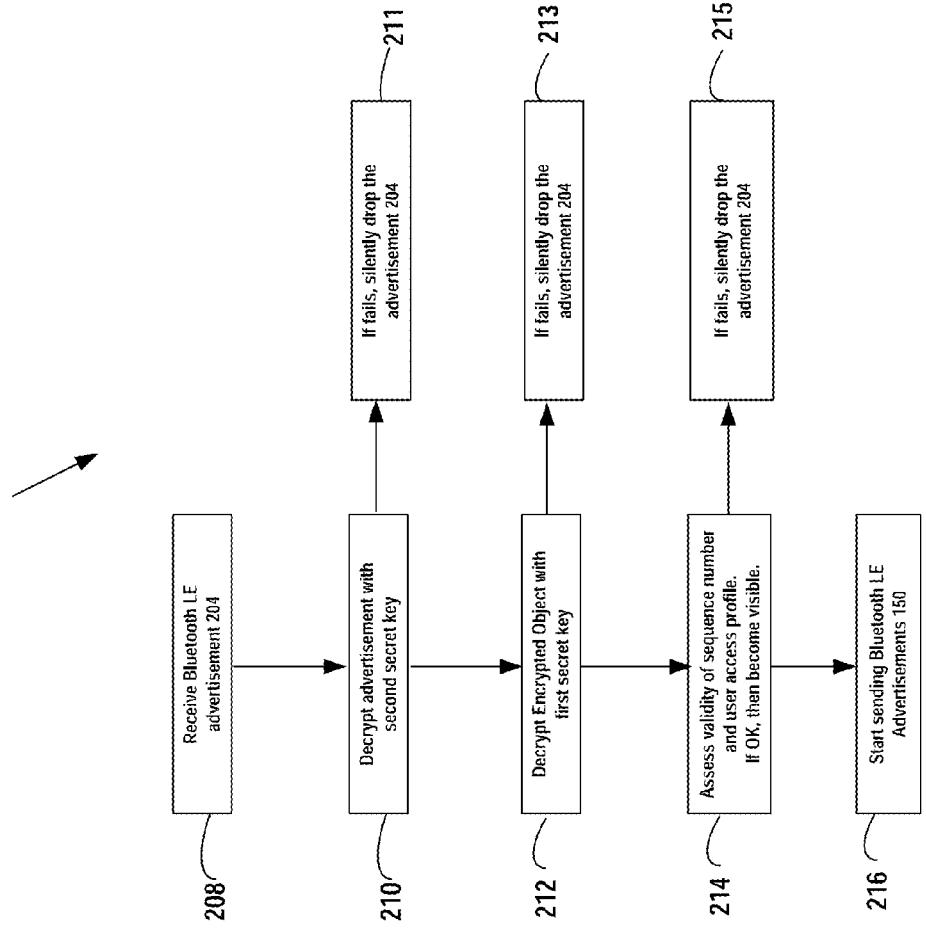

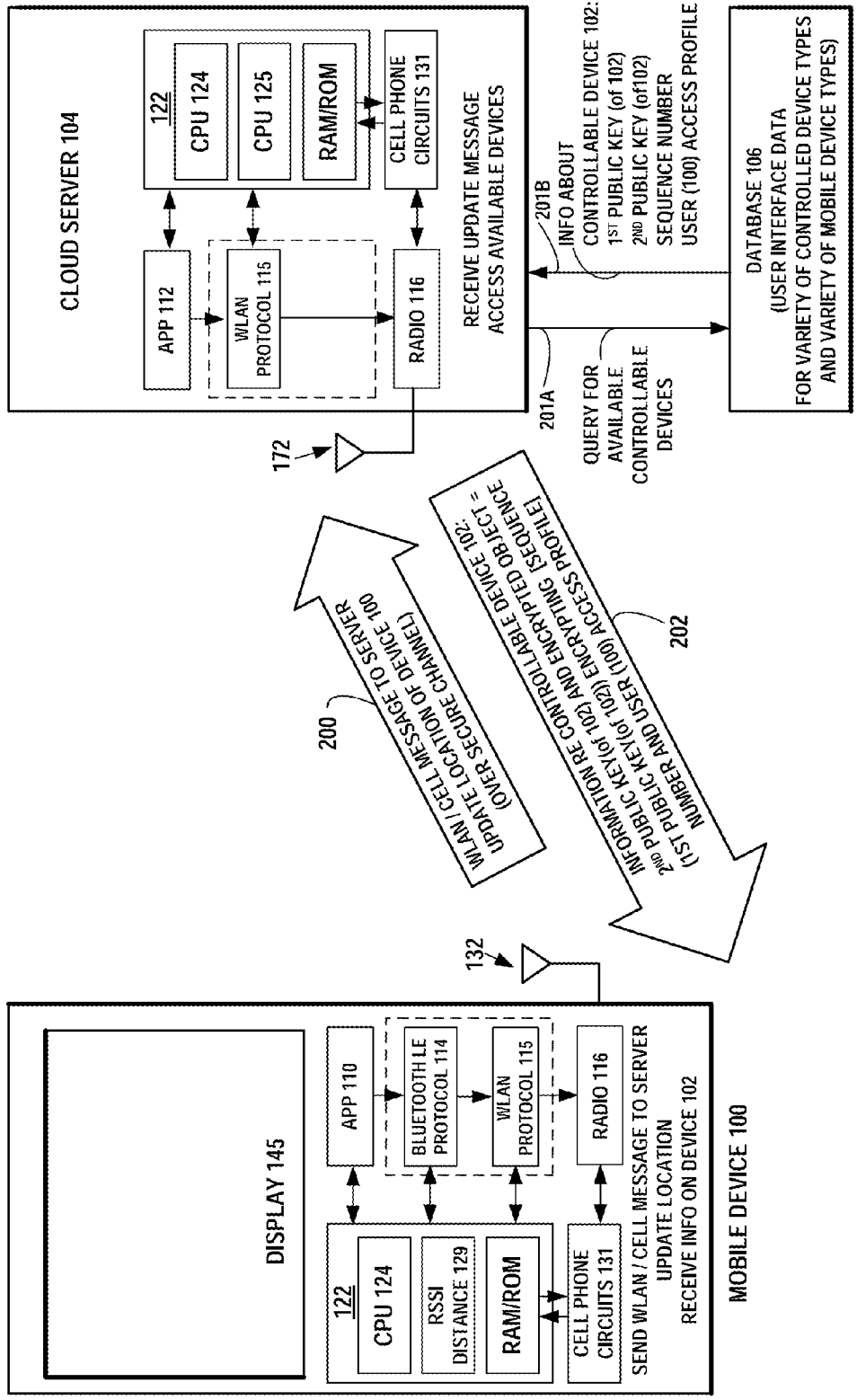

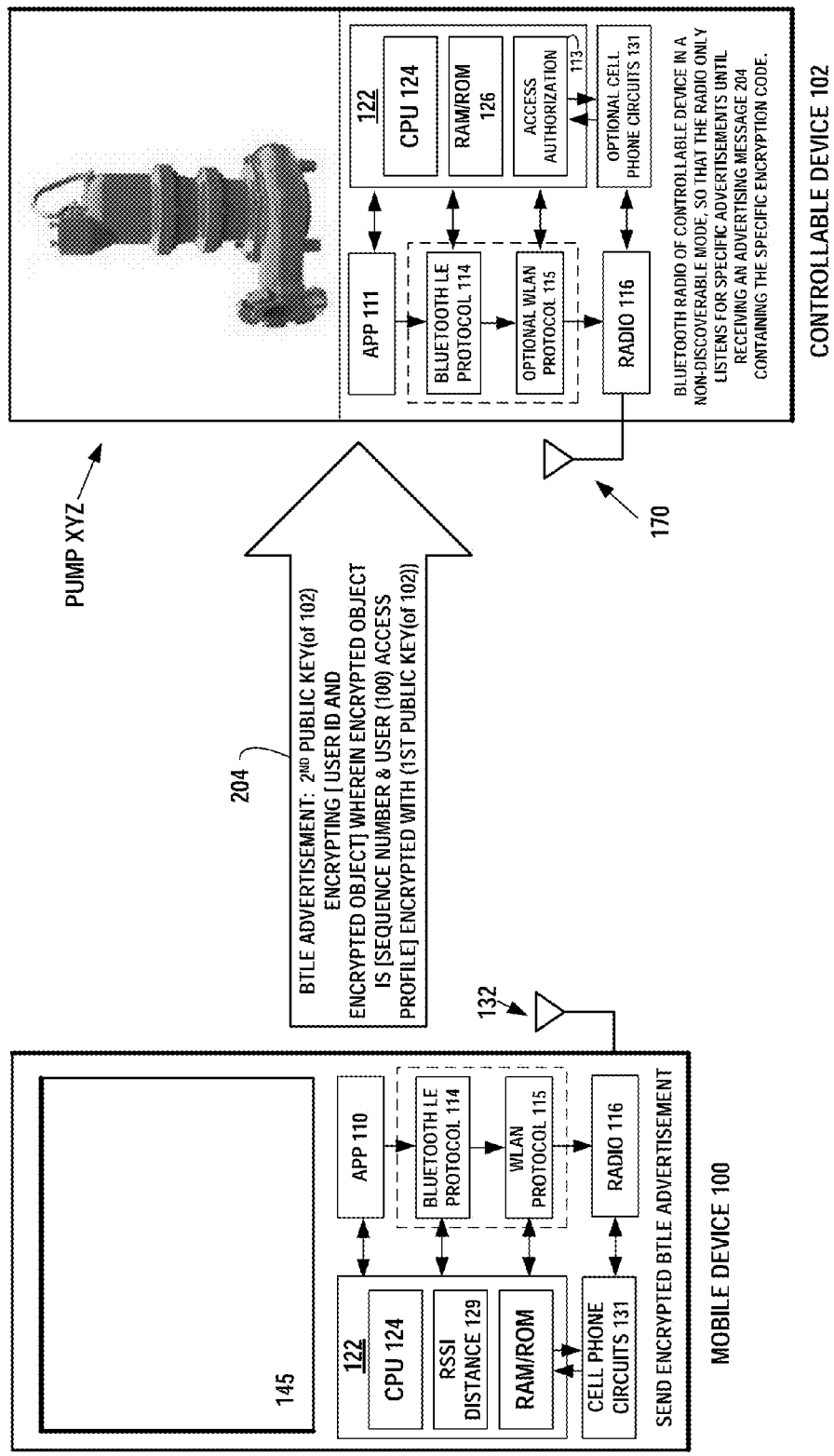

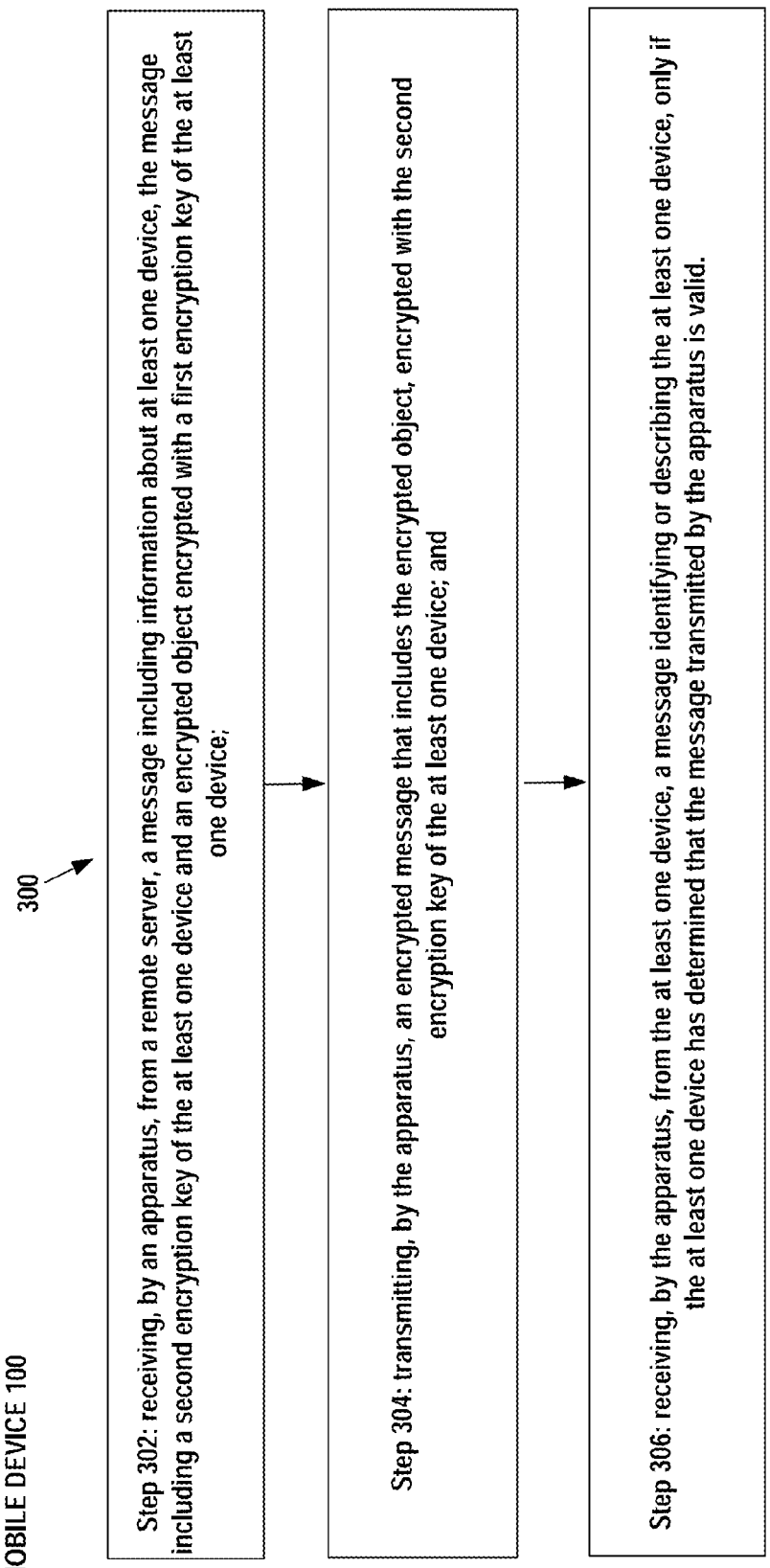

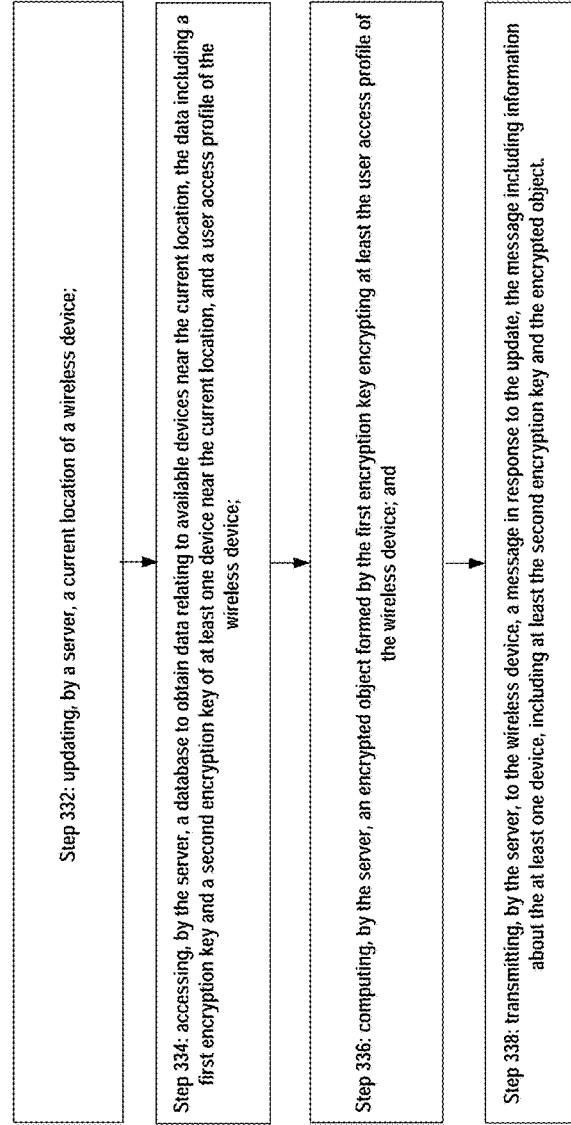

FIG. 1F
PROCESS IN SERVER 104

330

Step 332: updating, by a server, a current location of a wireless device;

Step 334: accessing, by the server, a database to obtain data relating to available devices near the current location, the data including a first encryption key and a second encryption key of at least one device near the current location, and a user access profile of the wireless device;

Step 336: computing, by the server, an encrypted object formed by the first encryption key encrypting at least the user access profile of the wireless device; and Step 338: transmitting, by the server, to the wireless device, a message in response to the update, the message including information about the at least one device, including at least the second encryption key and the encrypted object.

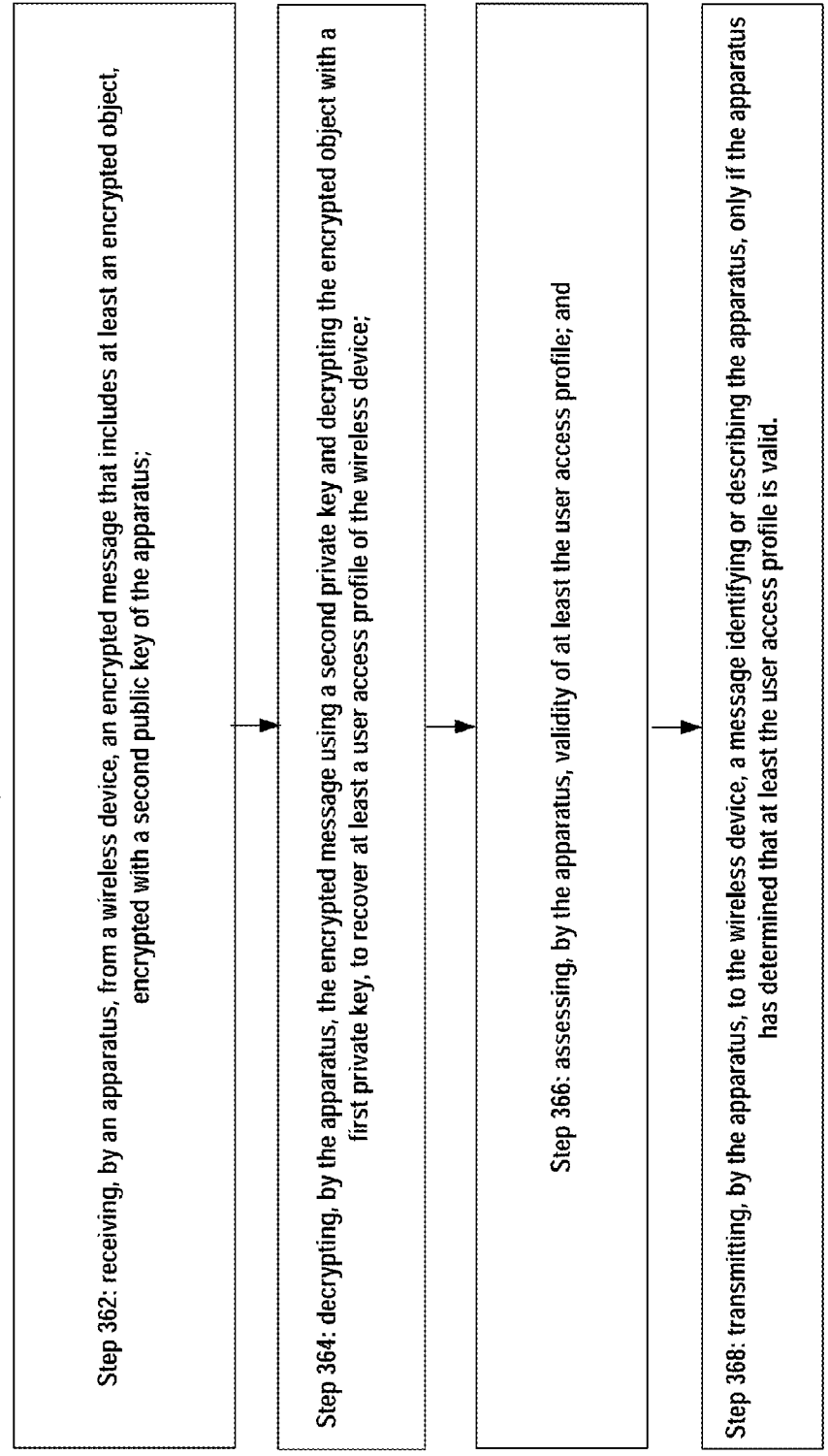

FIG. 1G

PROCESS IN CONTROLLABLE DEVICE 102

360

Step 362: receiving, by an apparatus, from a wireless device, an encrypted message that includes at least an encrypted object, encrypted with a second public key of the apparatus;

Step 364: decrypting, by the apparatus, the encrypted message using a second private key and decrypting the encrypted object with a first private key, to recover at least a user access profile of the wireless device;

Step 366: assessing, by the apparatus, validity of at least the user access profile; and Step 368: transmitting, by the apparatus, to the wireless device, a message identifying or describing the apparatus, only if the apparatus has determined that at least the user access profile is valid.

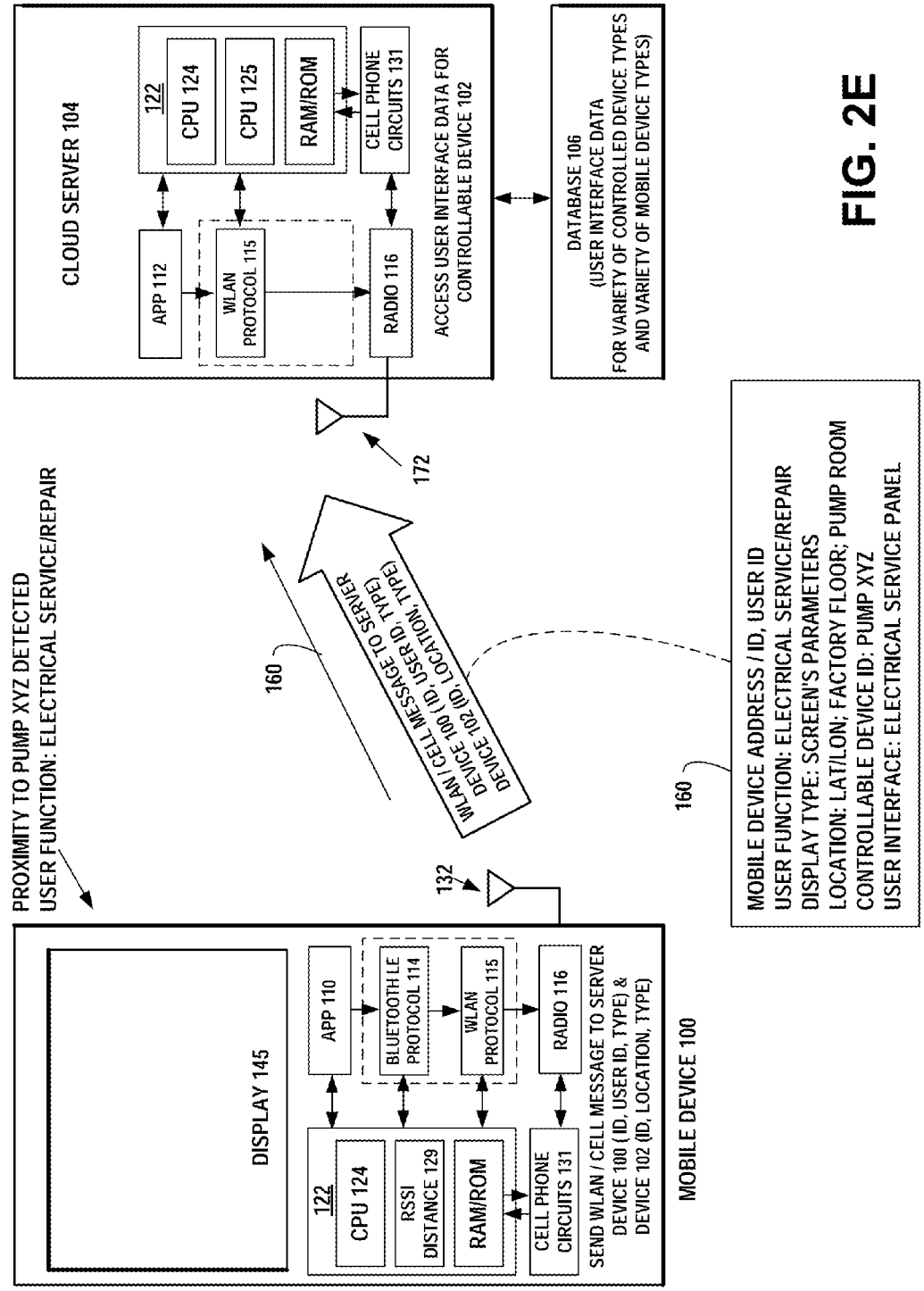

BTLE ADVERTISING MESSAGE
150

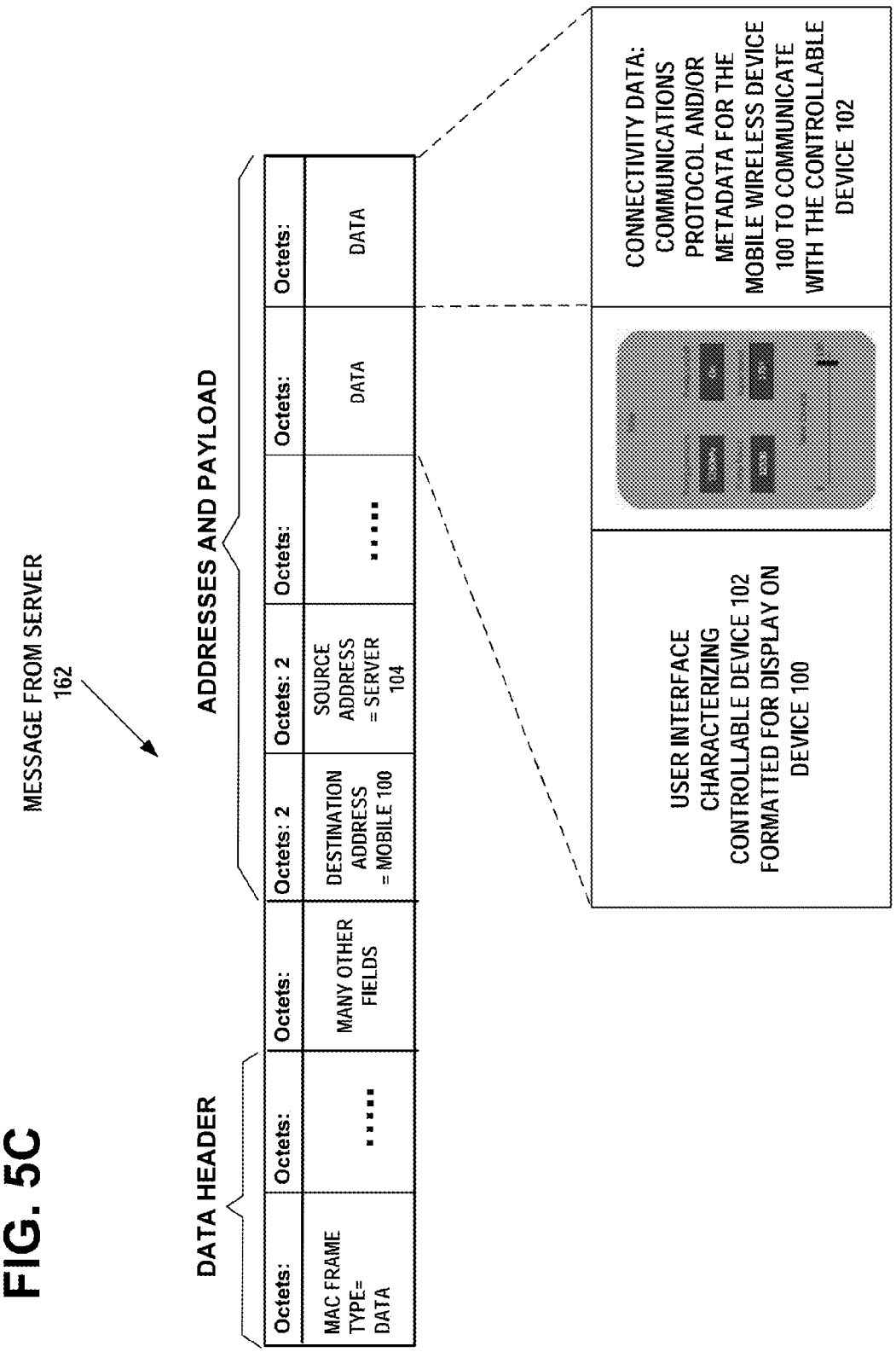

PROCESS IN MOBILE DEVICE 100

FIG. 7B

PROCESS IN
SERVER 104

750 →

Step 752: receiving, by a server, a message from a requesting wireless device, requesting a user interface corresponding to a user function to be performed by the requesting wireless device, the request message containing information including at least one of a user identifier, an indication of characteristics of the requesting wireless device and an indication relating to an address of another device that is to be monitored or controlled by the requesting wireless device using the requested user interface;

→

Step 754: accessing, by the server, a database to obtain data relating to the requested user interface;

→

Step 756: composing, by the server, information based on the information received by the server in the request message, the information composed by the server including at least information suitable for compiling a user interface including parameters enabling at least one of controlling and monitoring of the other device; and

→

Step 758: transmitting, by the server to the requesting wireless device, the information composed by the server.

METHOD, APPARATUS, AND COMPUTER PROGRAM PRODUCT FOR A SERVER CONTROLLED DEVICE WAKEUP

FIELD

The technology field relates to wireless control of devices using information received from the proximate devices via short range communication.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing electrical network as a power source. Due to rapid development of the wireless communication devices a number of areas capable of enabling entirely new types of communication applications have emerged.

An example of a wireless short-range communication technology is Bluetooth™ communication protocol, which operates in the 2.4 GHz ISM band. Bluetooth™ is a short-range radio network, originally intended as a cable replacement. Bluetooth™ Technical Specifications are published by the Bluetooth™ SIG, Inc. The Bluetooth™ *Core Specification, Version* 4.1, Bluetooth™ SIG, Dec. 3, 2013 (incorporated herein by reference), describes the Bluetooth™ Basic Rate/Enhanced Data Rate (BR/EDR) protocol and the Bluetooth™ Low Energy protocol (LE).

SUMMARY

Method, apparatus, and computer program product example embodiments enhance wireless control of proximate devices.

An example embodiment of the invention includes a method comprising:

receiving, by an apparatus, from a remote server, a message including information about at least one device, the message including a second encryption key of the at least one device and an encrypted object encrypted with a first encryption key of the at least one device;

transmitting, by the apparatus, an encrypted message that includes the encrypted object, encrypted with the second encryption key of the at least one device; and receiving, by the apparatus, from the at least one device, a message identifying or describing the at least one device, only if the at least one device has determined that the message transmitted by the apparatus is valid.

An example embodiment of the invention includes a method comprising:

wherein the encrypted object includes at least one of an encrypted sequence number and a user access profile of the apparatus, encrypted with the first encryption key of the at least one device.

An example embodiment of the invention includes a method comprising:

wherein the first and second encryption keys are public keys of the at least one device and the server maintains, at least the first encryption key a secret.

An example embodiment of the invention includes a method comprising:

receiving, by an apparatus, an identifier associated with a device;

transmitting, by the apparatus, a message to a remote server, requesting a user interface corresponding to a user function to be performed with the apparatus, the request message containing information including at least one of a user identifier, an indication of characteristics of the apparatus and an indication relating to the received identifier of the device;

receiving, by the apparatus, from the server, information composed by the server based on the information transmitted to the server in the request message, the information received from the server including at least information suitable for compiling a user interface including parameters enabling at least one of controlling and monitoring of the device; and providing, by the apparatus, a user interface compiled based on the received information, to enable a user of the apparatus to perform the user function of at least one of monitoring and controlling the device.

An example embodiment of the invention includes a method comprising:

receiving, by an apparatus, from a wireless device, an encrypted message that includes at least an encrypted object, encrypted with a second encryption key of the apparatus;

decrypting, by the apparatus, the encrypted message using a second encryption key and decrypting the encrypted object with a first encryption key, to recover at least a user access profile of the wireless device;

assessing, by the apparatus, validity of at least the user access profile; and transmitting, by the apparatus, to the wireless device, a message identifying or describing the apparatus, only if the apparatus has determined that at least the user access profile is valid.

An example embodiment of the invention includes a method comprising:

the encryption keys are one of public or private keys.

An example embodiment of the invention includes a method comprising:

updating, by a server, a current location of a wireless device;

accessing, by the server, a database to obtain data relating to available devices near the current location, the data including a first encryption key and a second encryption key of at least one device near the current location, and a user access profile of the wireless device;

computing, by the server, an encrypted object formed by the first encryption key encrypting at least the user access profile of the wireless device; and transmitting, by the server, to the wireless device, a message in response to the update, the message including information about the at least one device, including at least the second encryption key and the encrypted object.

An example embodiment of the invention includes a method comprising:

receiving, by the server, from the wireless device, an update message over a secure channel, containing an update of a current location of the wireless device and a request for available devices near the current location.

An example embodiment of the invention includes a method comprising:

receiving, by the server, a message from the wireless device, requesting a user interface corresponding to a user function to be performed by the wireless device, the request message containing information including at least a user identifier, an indication of characteristics of the wireless device and an indication relating to an address of another device that is to be monitored or controlled by the wireless device using the requested user interface;

accessing, by the server, a database to obtain data relating to the requested user interface;

composing, by the server, information based on the information received by the server in the request message, the information composed by the server including at least information suitable for compiling a user interface including parameters enabling controlling of the other device; and transmitting, by the server to the wireless device, the information composed by the server.

An example embodiment of the invention includes a method comprising:

composing, by the server, a user interface based on the information received by the server in the request message, the user interface including parameters characterizing the wireless device; and transmitting, by the server to the wireless device, the user interface composed by the server.

An example embodiment of the invention includes an apparatus comprising:

at least one processor;

at least one memory including computer program code;

the at least one memory and the computer program code configured to, with the at least one processor, cause the apparatus at least to:

receive from a remote server, a message including information about at least one device, the message including a second encryption key of the at least one device and an encrypted object encrypted with a first encryption key of the at least one device;

transmit an encrypted message that includes the encrypted object, encrypted with the second encryption key of the at least one device; and receive from the at least one device, a message identifying or describing the at least one device, only if the at least one device has determined that the message transmitted by the apparatus is valid.

An example embodiment of the invention includes an apparatus comprising:

wherein the encrypted object includes at least one of an encrypted sequence number and a user access profile of the apparatus, encrypted with the first encryption key of the at least one device.

An example embodiment of the invention includes an apparatus comprising:

wherein the first and second encryption keys are public keys of the at least one device and the server maintains, at least the first encryption key a secret.

An example embodiment of the invention includes an apparatus comprising:

the at least one memory and the computer program code configured to, with the at least one processor, cause the apparatus at least to:

receive at least an identifier associated with a device;

transmit a message to a remote server, requesting a user interface corresponding to a user function to be performed with the apparatus, the request message containing information including at least one of a user identifier, an indication of characteristics of the apparatus and an indication relating to the received identifier of the device;

receive from the server, information composed by the server based on the information transmitted to the server in the request message, the information received from the server including at least information suitable for compiling a user interface including parameters enabling at least one of controlling and monitoring of the device; and provide a user interface compiled based on the received information, to enable a user of the apparatus to perform the user function of at least one of monitoring and controlling the device.

An example embodiment of the invention includes an apparatus comprising:

at least one processor;

at least one memory including computer program code;

the at least one memory and the computer program code configured to, with the at least one processor, cause the apparatus at least to:

receive from a wireless device, an encrypted message that includes at least an encrypted object, encrypted with a second encryption key of the apparatus;

decrypt the encrypted message using a second encyrption key and decrypting the encrypted object with a first encryption key, to recover at least a user access profile of the wireless device;

assess validity of at least the user access profile; and transmit to the wireless device, a message identifying or describing the apparatus, only if the apparatus has determined that at least the user access profile is valid.

An example embodiment of the invention includes an apparatus comprising:

the encryption keys are one of public or private keys.

An example embodiment of the invention includes an apparatus comprising:

at least one processor;

at least one memory including computer program code;

the at least one memory and the computer program code configured to, with the at least one processor, cause the apparatus at least to:

update a current location of a wireless device;

access a database to obtain data relating to available devices near the current location, the data including a first encryption key and a second encryption key of at least one device near the current location, and a user access profile of the wireless device;

compute an encrypted object formed by the first encryption key encrypting at least the user access profile of the wireless device; and transmit to the wireless device, a message in response to the update, the message including information about the at least one device, including at least the second encryption key and the encrypted object.

An example embodiment of the invention includes an apparatus comprising:

receive from the wireless device, an update message over a secure channel, containing an update of a current location of the wireless device and a request for available devices near the current location.

An example embodiment of the invention includes a computer program product comprising computer executable program code recorded on a computer readable, non-transitory storage medium, the computer executable program code comprising:

code for receiving, by an apparatus, from a remote server, a message including information about at least one device, the message including a second encryption key of the at least one device and an encrypted object encrypted with a first encryption key of the at least one device;

code for transmitting, by the apparatus, an encrypted message that includes the encrypted object, encrypted with the second encryption key of the at least one device; and code for receiving, by the apparatus, from the at least one device, a message identifying or describing the at least one device, only if the at least one device has determined that the message transmitted by the apparatus is valid.

An example embodiment of the invention includes a computer program product comprising computer executable program code recorded on a computer readable, non-transitory storage medium, the computer executable program code comprising:

code for receiving, by an apparatus, from a wireless device, an encrypted message that includes at least an encrypted object, encrypted with a second encryption key of the apparatus;

code for decrypting, by the apparatus, the encrypted message using a second private key and decrypting the encrypted object with a first private key, to recover at least a user access profile of the wireless device;

code for assessing, by the apparatus, validity of at least the user access profile; and code for transmitting, by the apparatus, to the wireless device, a message identifying or describing the apparatus, only if the apparatus has determined that at least the user access profile is valid.

An example embodiment of the invention includes a computer program product comprising:

the encryption keys are one of public or private keys.

An example embodiment of the invention includes a computer program product comprising computer executable program code recorded on a computer readable, non-transitory storage medium, the computer executable program code comprising:

code for receiving, by a server, from a wireless device, an update message over a secure channel, containing an update of a current location of the wireless device and a request for available devices near the current location;

code for accessing, by the server, a database to obtain data relating to available devices near the current location, in response to the update message, the data including a first encryption key and a second encryption key of at least one device near the current location, and a user access profile of the wireless device;

code for computing, by the server, an encrypted object formed by the first encryption key encrypting at least the user access profile of the wireless device; and code for transmitting, by the server, to the wireless device, a message in response to the update message, the message including information about the at least one device, including at least the second encryption key and the encrypted object.

DESCRIPTION OF THE FIGURES

The group of FIGS. 1 to 1G illustrates an example security enhancement to the example embodiment shown in the group of FIGS. 2A to 2G, to make the user interface control concept more.

FIG. 1 is an illustration of an example embodiment of a message flow for a cloud-controlled Bluetooth LE device wakeup of a controllable device. The controlled device initially stays hidden, not advertising its presence, in accordance with at least one embodiment of the present invention.

FIG. 1A is an illustration of an example embodiment of the controllable device of FIG. 2, receiving and handling the Bluetooth LE advertisement, in accordance with at least one embodiment of the present invention.

FIG. 1B is an illustration of an example embodiment of the network of FIG. 2B, wherein the mobile wireless device is shown sending to the cloud server, a message for example over a WLAN or cellular connection, over a secure channel, containing an update of the current location of the mobile wireless device (for example, its latitude and longitude, and environment, such as a factory floor and pump room) and its request for available controllable devices in its area. The figure shows the cloud server, in response, accessing a database to retrieve information about a controllable device in the area of the mobile wireless device, the information including a first public key and a second public key of the controllable device, a sequence number, and a user access profile of the mobile wireless device. The figure shows the cloud server transmitting to the mobile wireless device, a reply message including at least the second public key and an encrypted object formed by encrypting at least the sequence number and user access profile with the first public key, in accordance with at least one embodiment of the present invention.

FIG. 1C is an illustration of an example embodiment of the network of FIG. 2A, wherein the mobile wireless device transmits to the controllable device, a Bluetooth™ Low Energy protocol (BTLE) advertisement message that includes at least the encrypted object further encrypted by the second public key, wherein the encrypted object is at least the sequence number and user access profile that are encrypted by the first public key, in accordance with at least one embodiment of the present invention.

FIG. 1E is an illustration of an example flow diagram of an example process in the mobile wireless device, carrying out the example operations, in accordance with at least one embodiment of the present invention.

FIG. 1F is an illustration of an example flow diagram of an example process in the cloud server, carrying out the example operations, in accordance with at least one embodiment of the present invention.

FIG. 1G is an illustration of an example flow diagram of an example process in the controllable device, carrying out the example operations, in accordance with at least one embodiment of the present invention.

The group of FIGS. 2A to 2G illustrates an example of a server providing a user interface (UI) based on a detected proximity between a mobile wireless device and a controllable device.

Figure 1D:
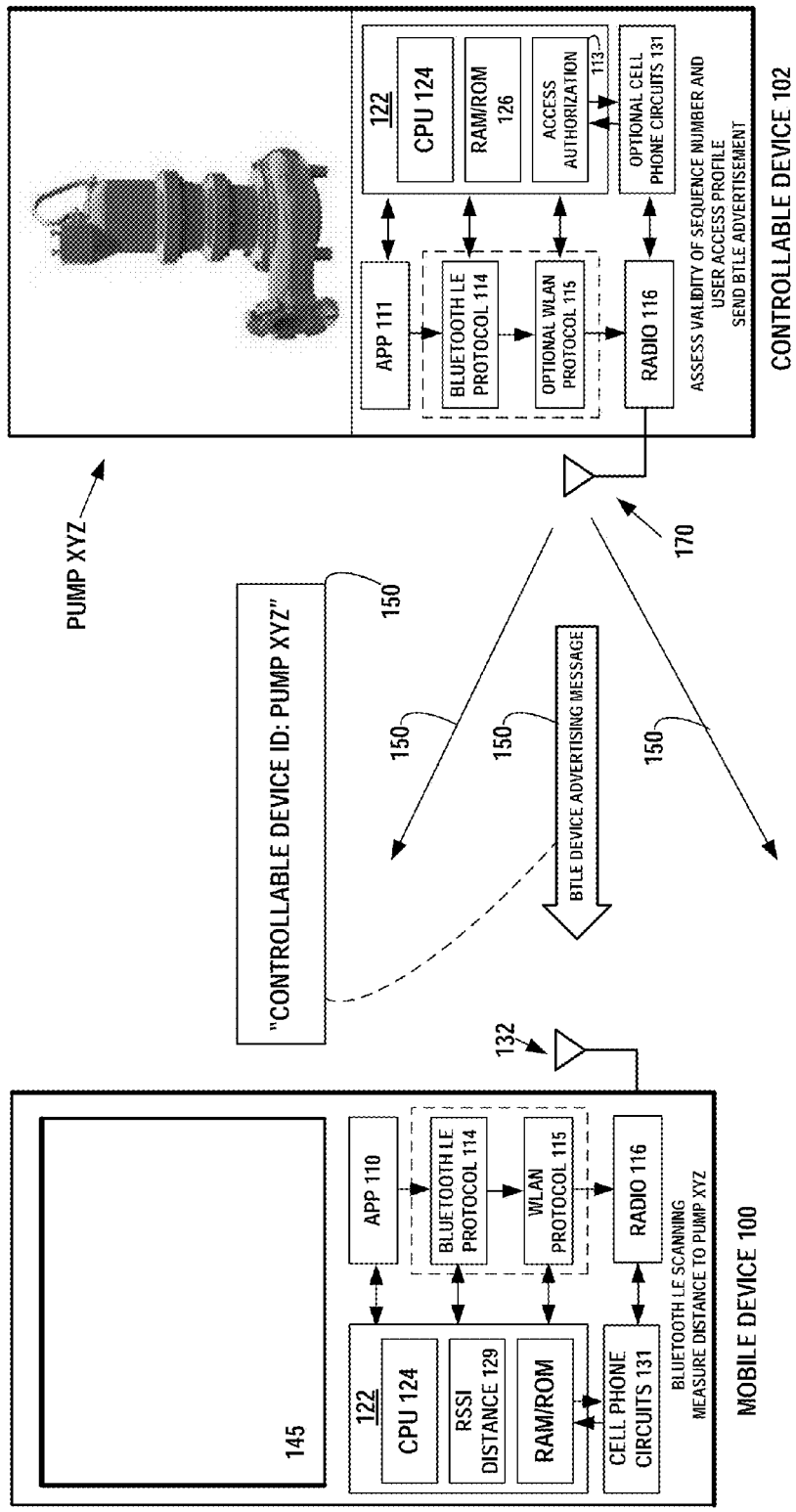
FIG. 1D is an illustration of an example embodiment of the network of FIG. 1C, wherein the controllable device decrypts the advertisement message and the encrypted object, to assess the validity of the sequence number and the user access profile. If the controllable device determines that the sequence number and the user access profile are valid, then the controllable device reveals its presence by transmitting a BTLE advertisement containing information identifying the controllable device, in accordance with at least one embodiment of the present invention.
Figure 2A:
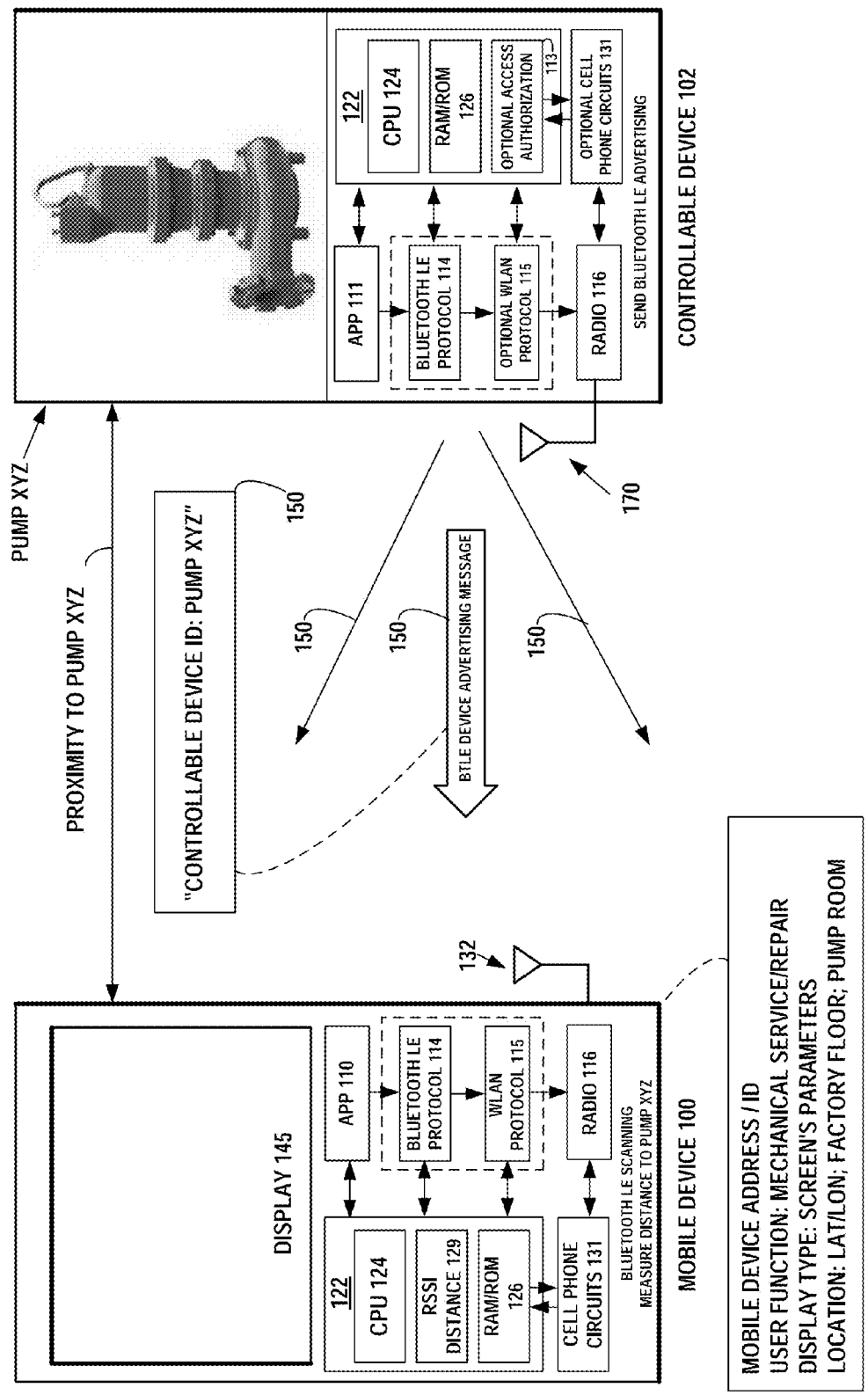

FIG. 2A is an illustration of an example embodiment of a network with a mobile wireless device and a controllable device. The mobile wireless device is shown scanning for Bluetooth™ Low Energy protocol (BTLE) advertising messages. The controllable device is shown transmitting BTLE advertising messages containing its identification and, optionally, a description of the controllable device capabilities. When the controllable device in the advertising state, enters the connection state, it will be in the slave role and the mobile wireless device will be in the master role in a BTLE data channel, in accordance with at least one embodiment of the present invention. In an alternate embodiment, the mobile wireless device may receive the device identifier from a remote server and the mobile wireless device may find the device locally. In the alternate embodiment, the mobile wireless device may also receive a user interface and connectivity data from the remote server, as shown in FIG. 1C, and the mobile wireless device may find the device locally and start communicating with the device based on the received information.

Figure 2B:
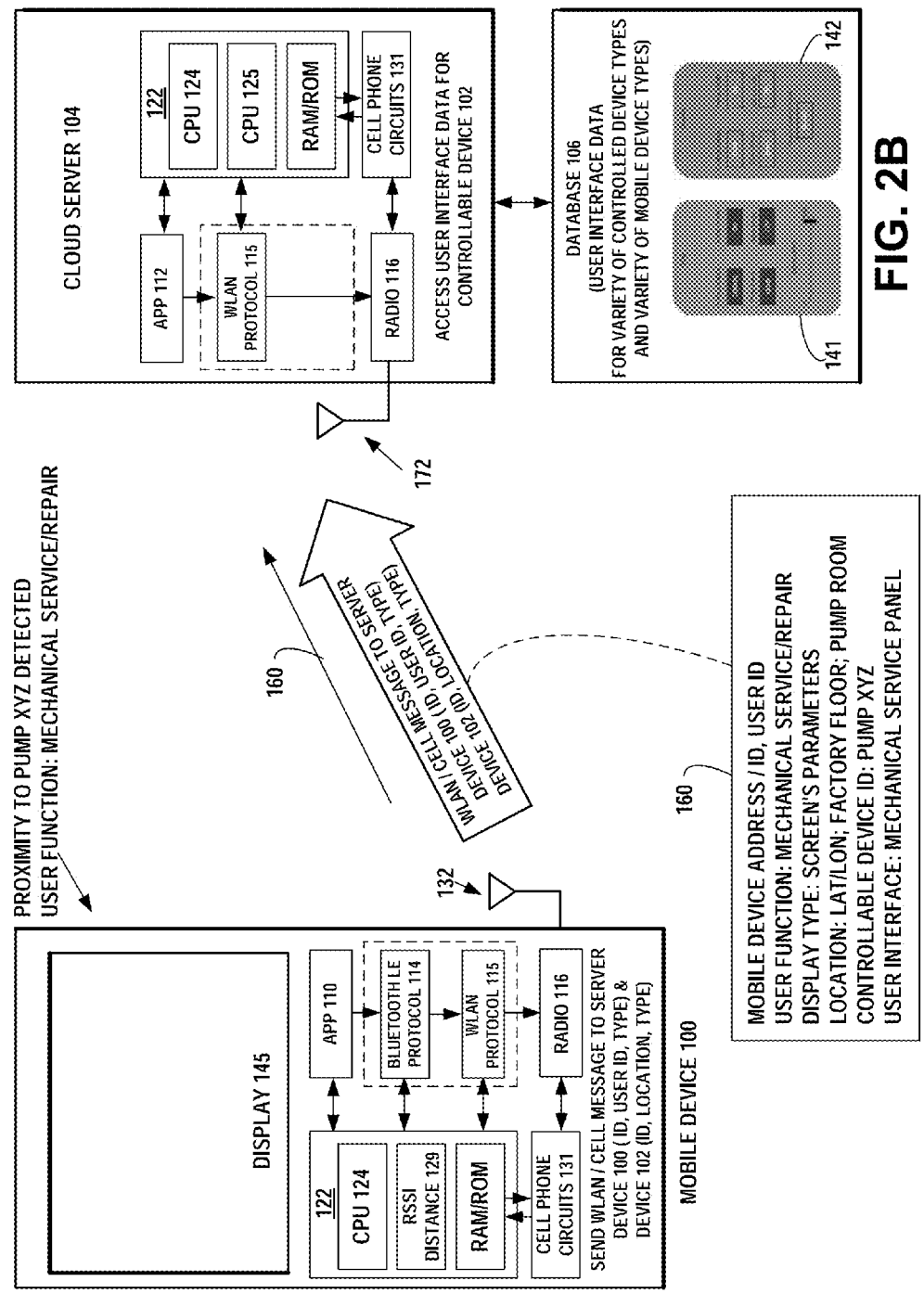

FIG. 2B is an illustration of an example embodiment of the network of FIG. 2A, wherein the user function to be performed is mechanical service/repair. The mobile wireless device is shown sending to the cloud server, a message for example over a WLAN or cellular connection, or just generally a message over the internet, containing information including its ID, user ID, user function: mechanical service/repair, display type: screen's parameters, location: lat/lon; factory floor; pump room, controllable device id: pump XYZ, and its request for the user interface: mechanical service panel, in accordance with at least one embodiment of the present invention.

Figure 2C:
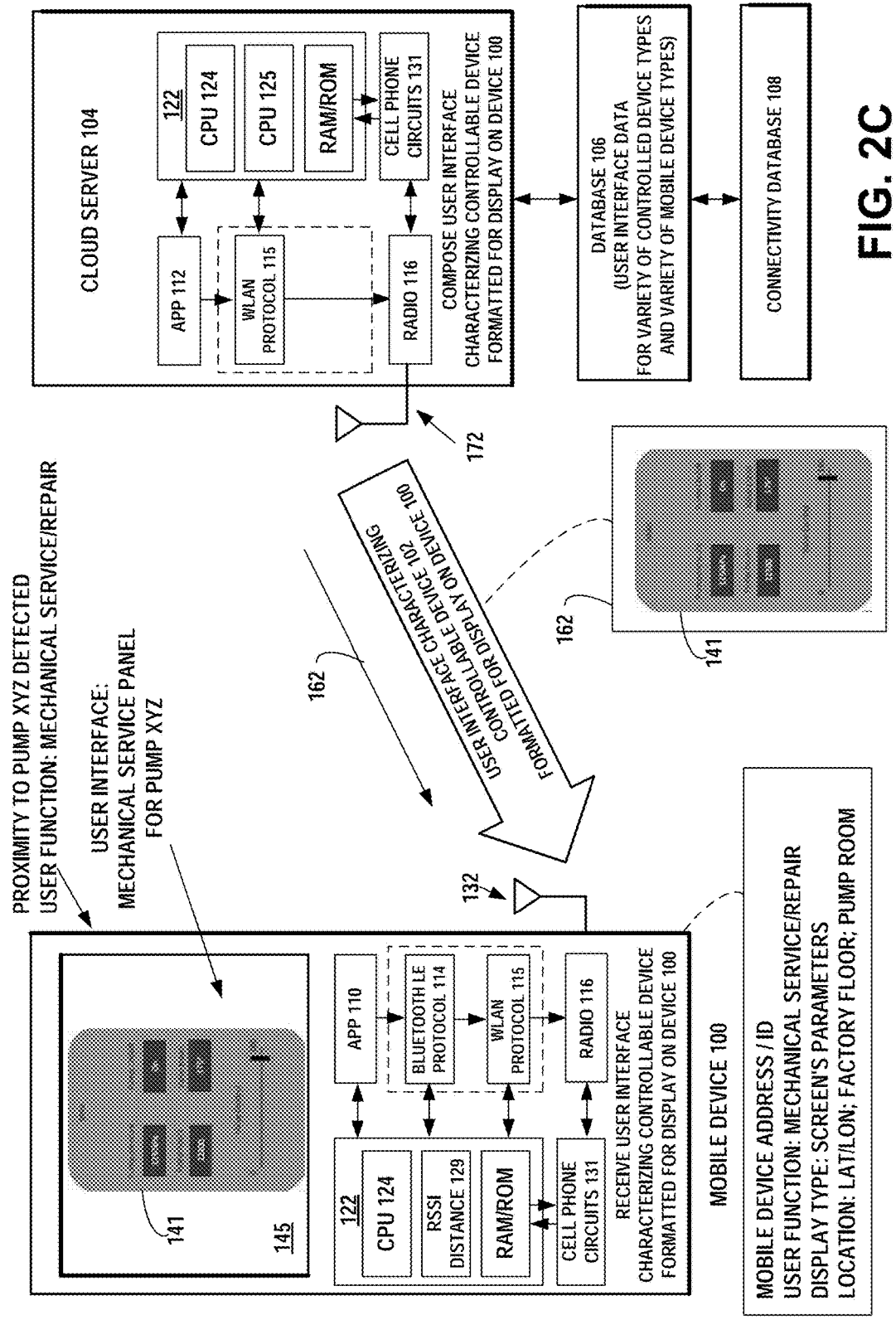

FIG. 2C is an illustration of an example embodiment of the network of FIG. 2B, wherein the cloud server uses the information received from the mobile wireless device, to access from a mapping database, data describing a user interface that characterizes the specified type of controlled device. The cloud server formats the user interface for display on the specified type of display of the mobile wireless device. The cloud server may access a connectivity database to obtain connectivity information, which the cloud server uses to send a message for example over a WLAN or cellular connection, containing the formatted user interface: mechanical service panel.

Figure 2D:
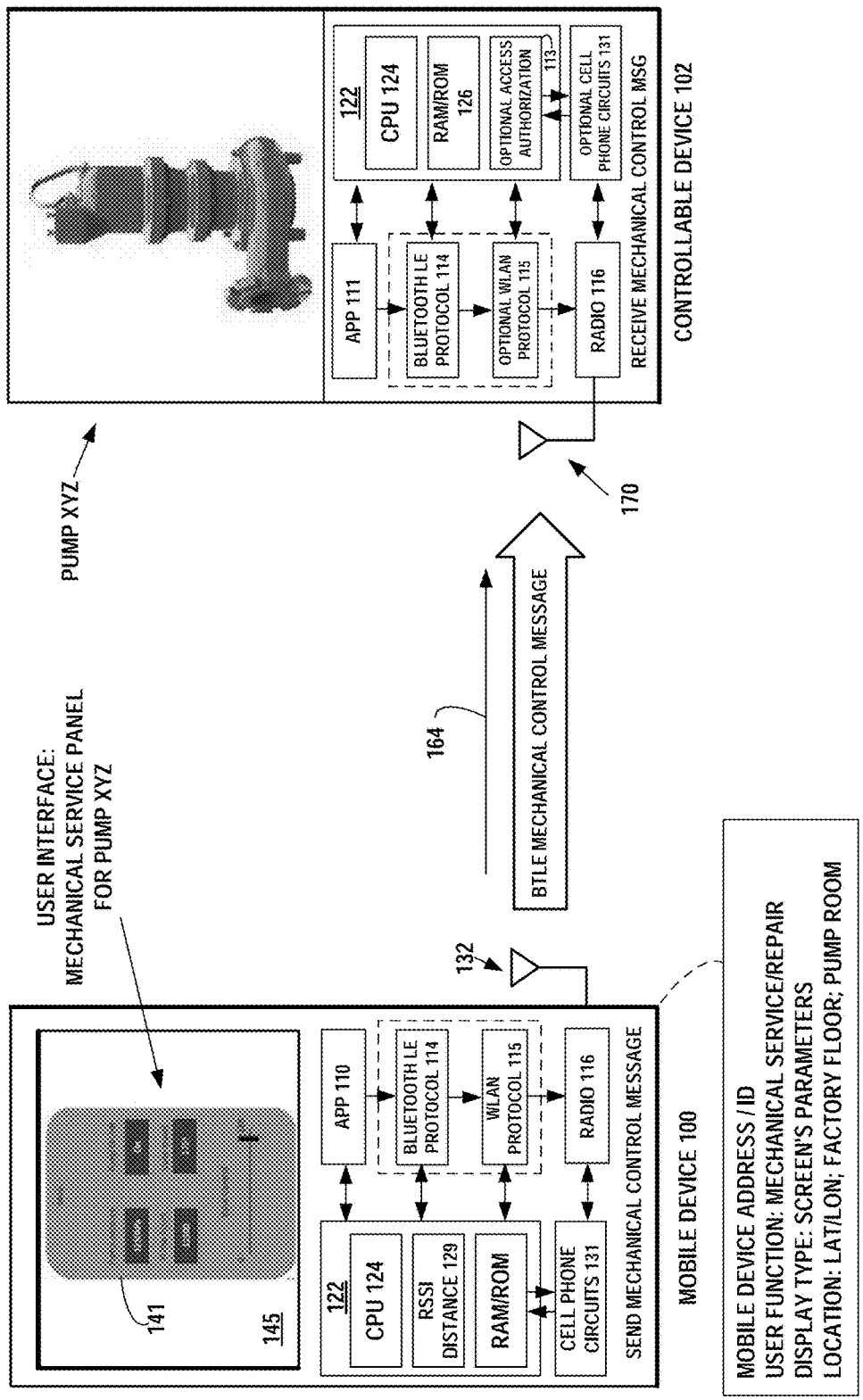

FIG. 2D is an illustration of an example embodiment of the network of FIG. 2C, wherein the user of the mobile wireless device used the mechanical service panel user interface displayed, to monitor and/or control the controllable device, by sending a BTLE mechanical control message to the controllable device.

FIG. 2E is an illustration of an example embodiment of the network of FIG. 2B, wherein the user function to be performed is electrical service/repair. The mobile wireless device is shown sending to the cloud server, a message for example over a WLAN or cellular connection, containing information including its ID, user function: electrical service/repair, display type: screen's parameters, location: lat/lon; factory floor; pump room, controllable device id: pump XYZ, and its request for the user interface: electrical service panel.

Figure 2F:
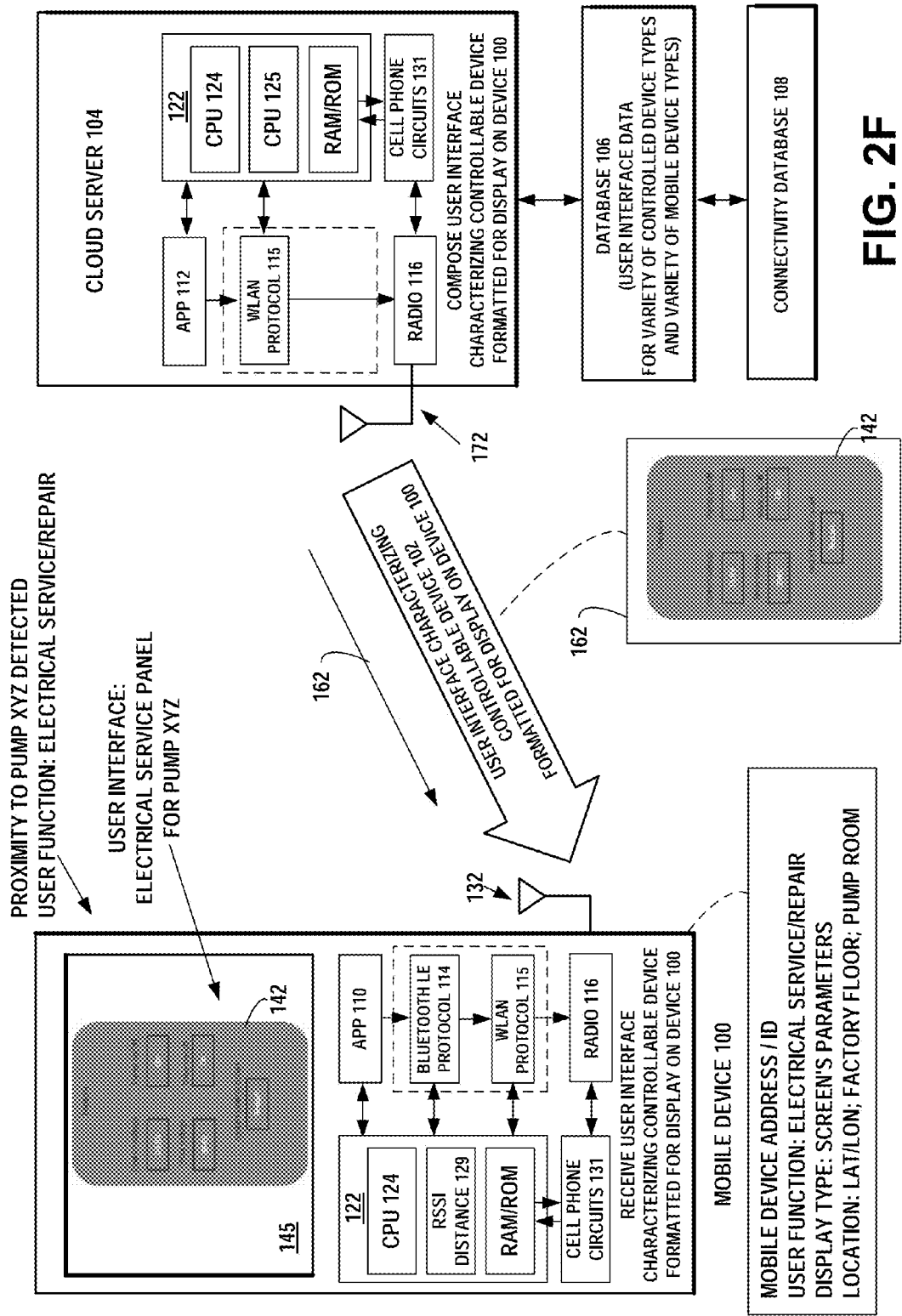

FIG. 2F is an illustration of an example embodiment of the network of FIG. 2E, wherein the cloud server uses the information received from the mobile wireless device, to access from a mapping database, data describing a user interface that characterizes the specified type of controlled device. The cloud server formats the user interface for display on the specified type of display of the mobile wireless device. The cloud server may access a connectivity database to obtain connectivity information, which the cloud server uses to send a message for example over a WLAN or cellular connection, containing the formatted user interface: electrical service panel.

Figure 2G:
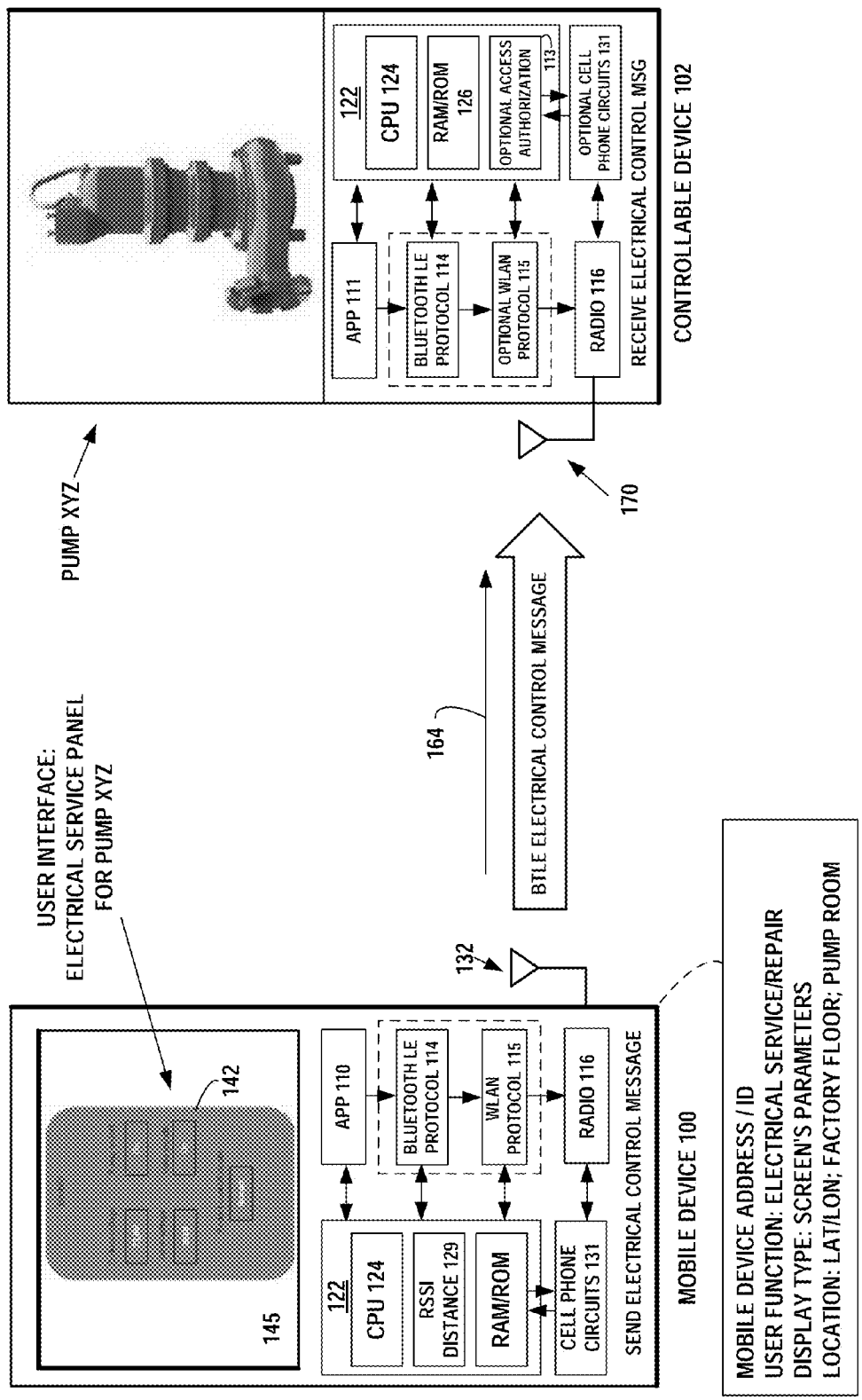

FIG. 2G is an illustration of an example embodiment of the network of FIG. 2F, wherein the user of the mobile wireless device used the electrical service panel user interface displayed, to monitor and/or control the controllable device, by sending a BTLE electrical control message to the controllable device.

Figure 3:
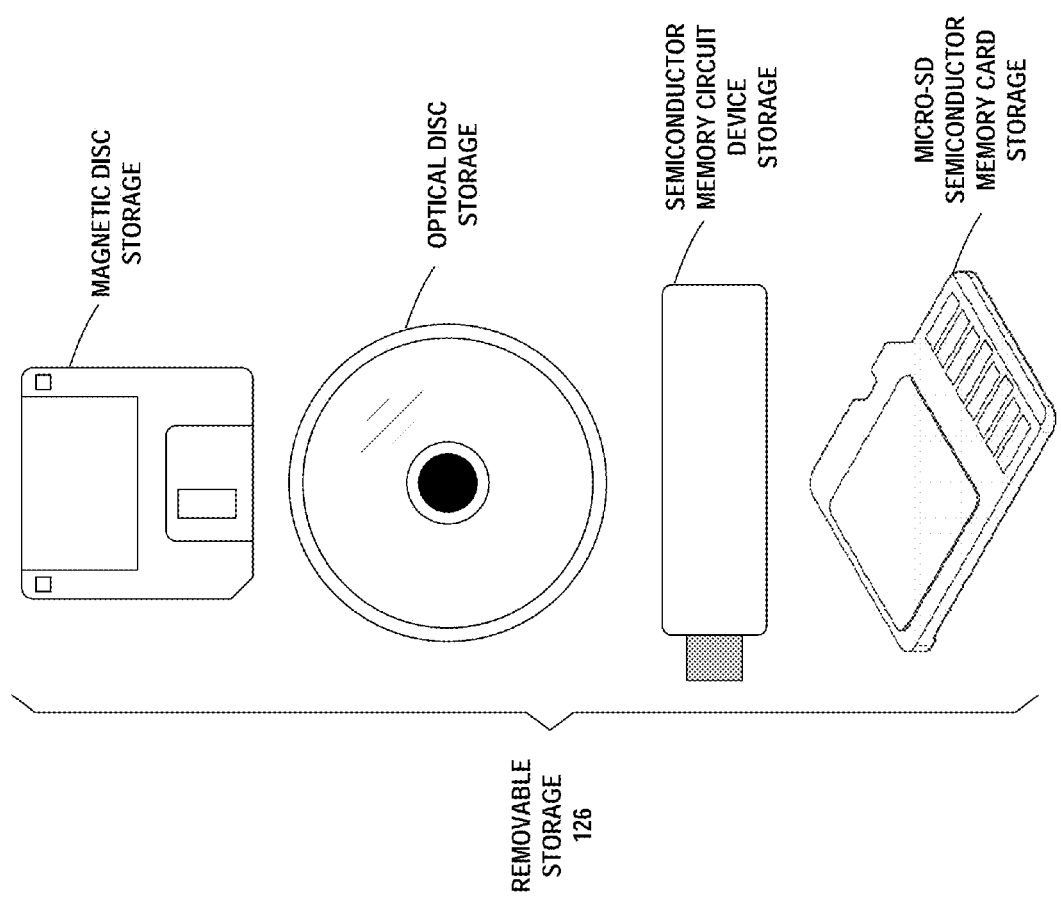

FIG. 3 illustrates an example embodiment of the invention, wherein examples of removable storage media are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

The group of FIGS. 4A to 4D illustrates an example extension of the example embodiment shown in the group of FIGS. 2A to 2G, wherein the user interface is preloaded into a cache of the mobile wireless device from the server, to enable offline use of the user interfaces, which are invoked only when a corresponding controllable device is detected to be in proximity. The offline use may be enabled on a per user, per area, per controllable device, or per time, basis.

Figure 4A:
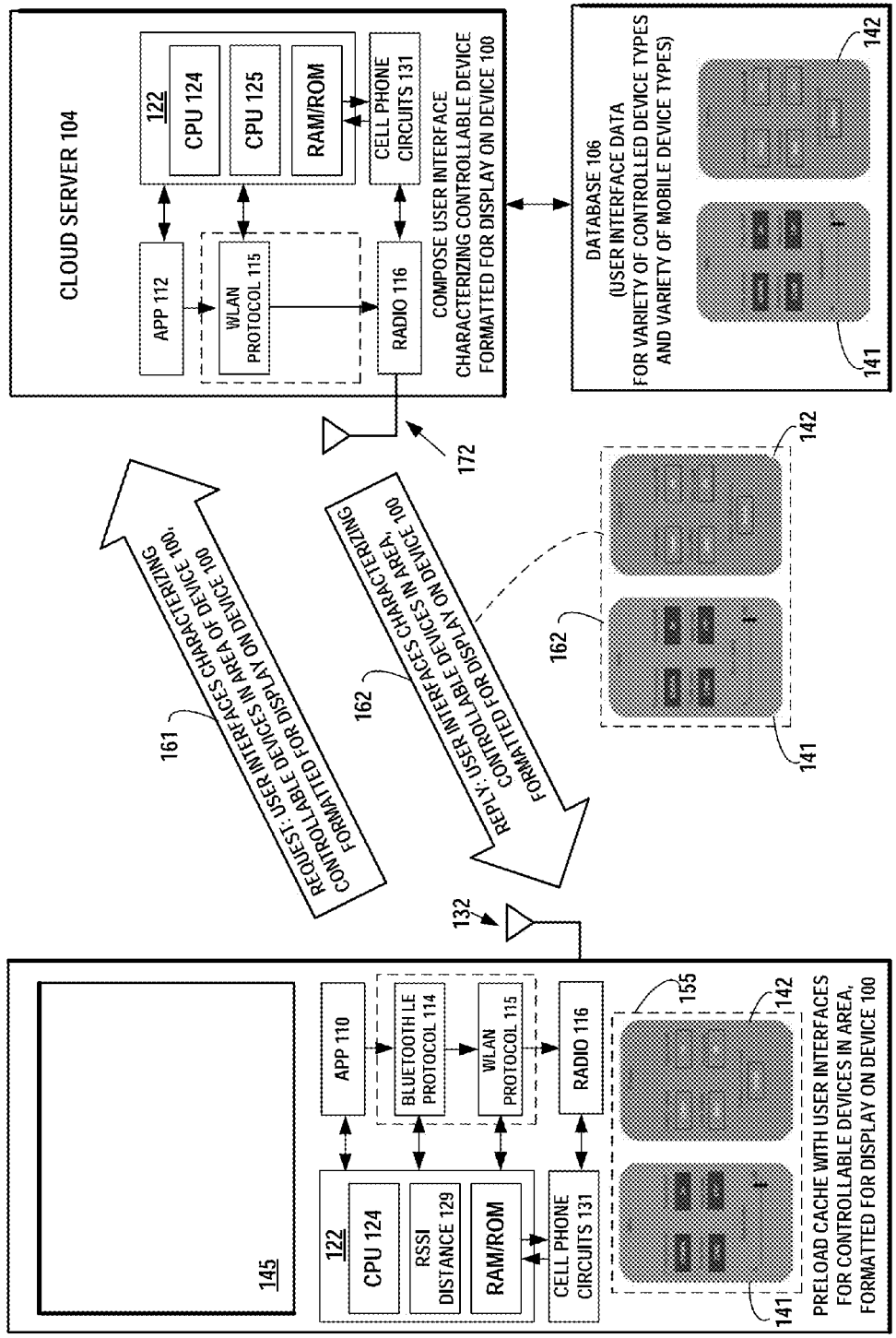

FIG. 4A is an illustration of an example embodiment of the network of FIG. 2B, wherein the mobile wireless device is shown sending to the cloud server, a WLAN or a cell phone request message requesting preloading of user interfaces characterizing controllable devices in the current area of mobile wireless device, formatted for display on mobile wireless device. The cloud server uses the information received from the mobile wireless device, to access from a mapping database, data describing appropriate user interfaces corresponding to controlled devices in the current area of the mobile wireless device. The figure shows the cloud server responding with a reply message including the requested user interfaces characterizing controllable devices, the pump XYZ, in the area of the mobile wireless device, formatted for display on the mobile wireless device. The requested user interfaces for the pump XYZ are preloaded into a cache in the mobile wireless device, in accordance with at least one embodiment of the present invention.

Figure 4B:
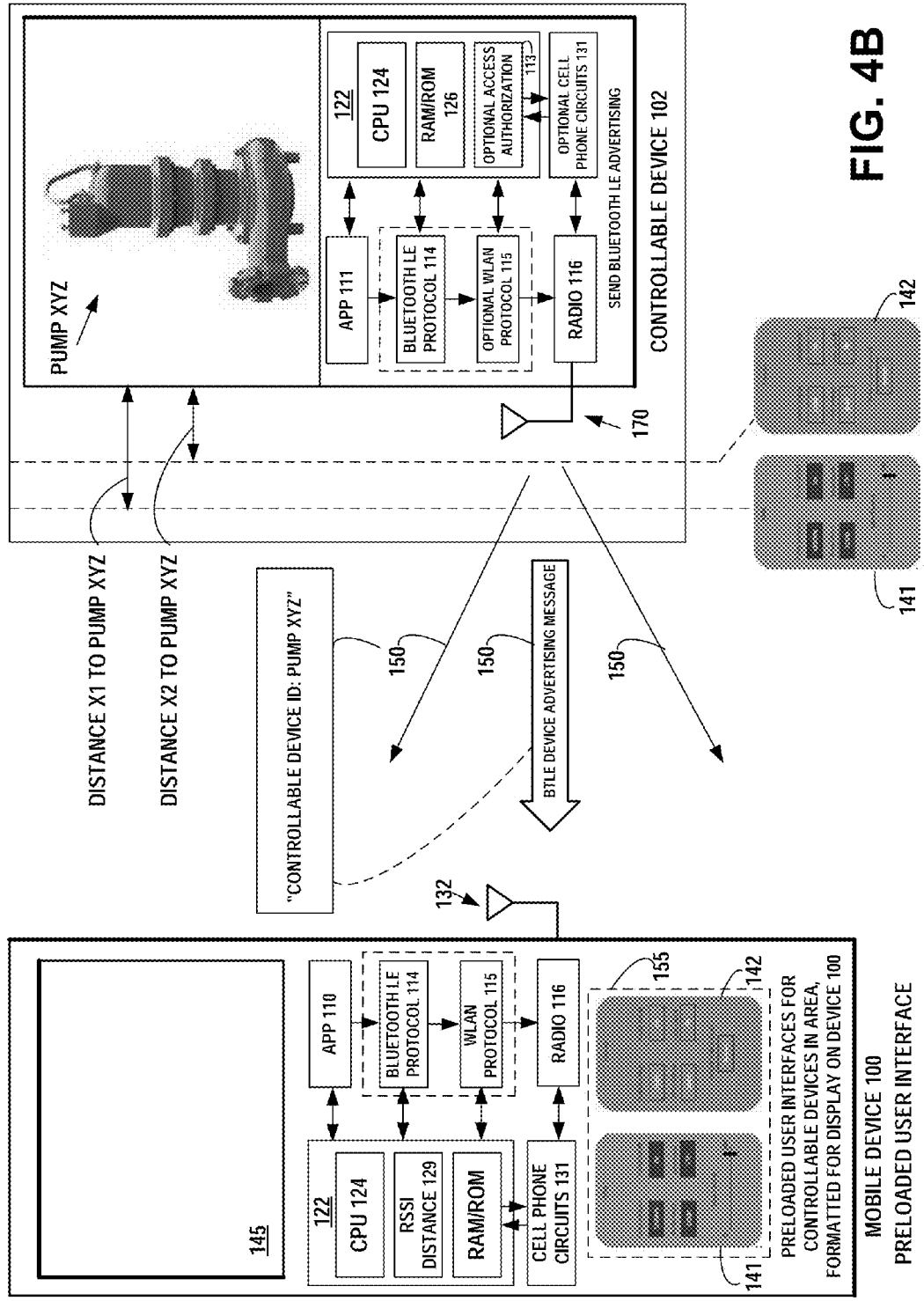

FIG. 4B is an illustration of an example embodiment of the network of FIG. 3, wherein a mechanical service panel is displayed as a user interface for the pump XYZ when the mobile device is near to a distance X1 from the pump. An electrical service panel is displayed as a user interface for the pump XYZ when the mobile device is near to a distance X2 from the pump, in accordance with at least one embodiment of the present invention.

Figure 4C:
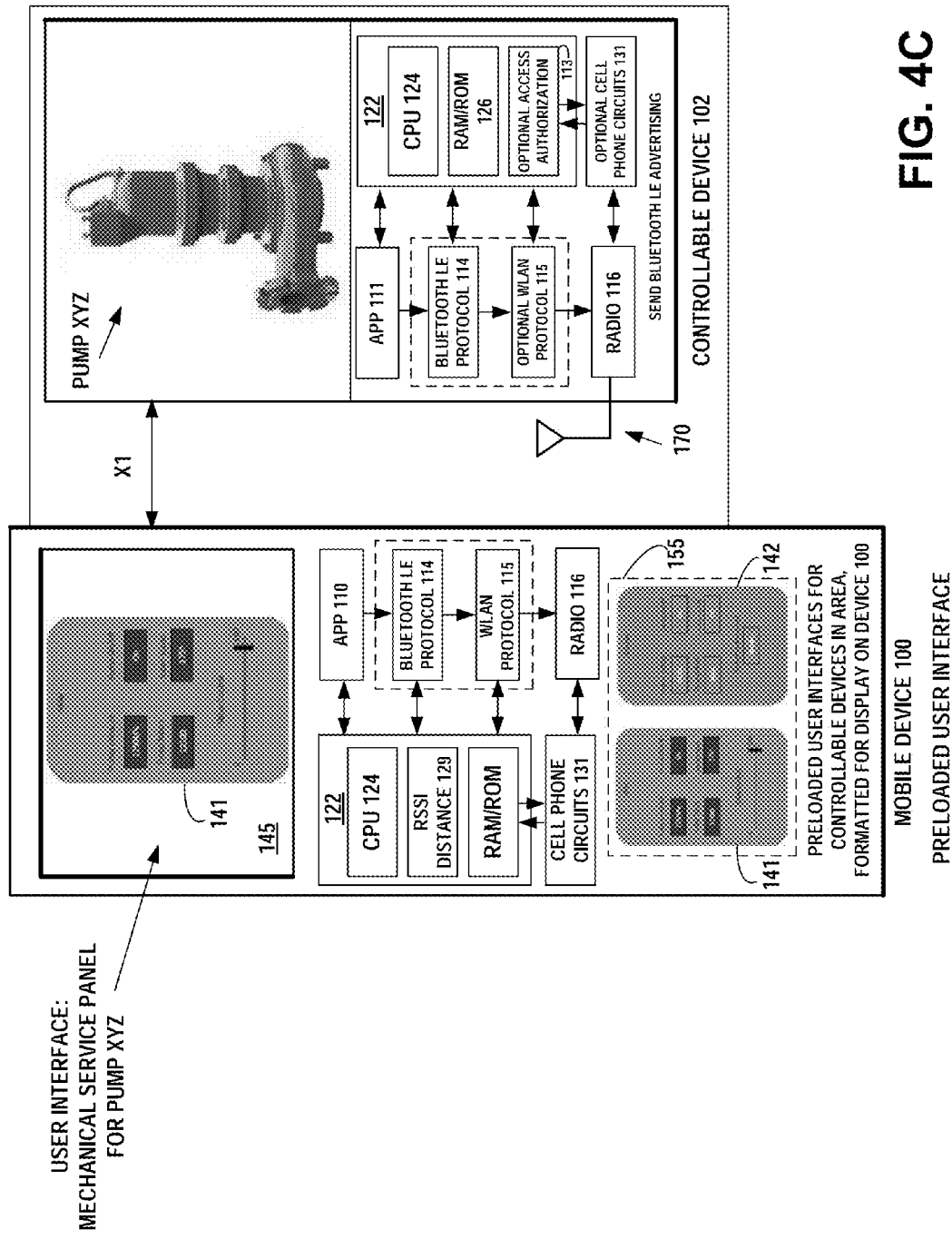

FIG. 4C is an illustration of an example embodiment of the network of FIG. 4B, wherein the mobile wireless device has moved closer at a distance X1 to the pump. The mobile wireless device is shown accessing the mechanical service panel from its cache for display as a user interface for the pump, when the mobile device is near to a distance X1 from the pump, in accordance with at least one embodiment of the present invention.

Figure 4D:
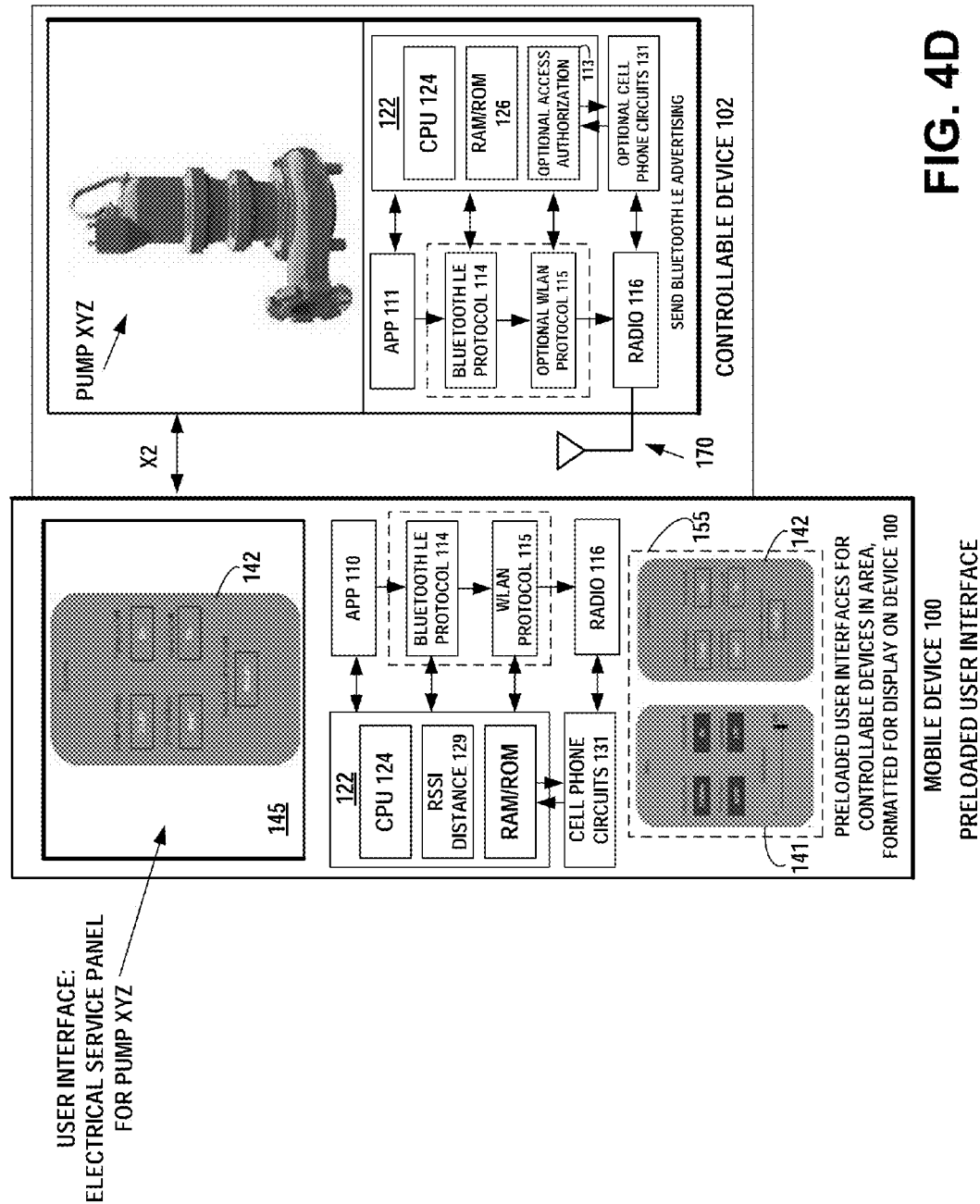

FIG. 4D is an illustration of an example embodiment of the network of FIG. 4B, wherein the mobile wireless device has moved closer at a distance X2 to the pump. The mobile wireless device is shown accessing the electrical service panel from its cache for display as a user interface for the pump, when the mobile device is near to a distance X2 from the pump, in accordance with at least one embodiment of the present invention.

Figure 5A:
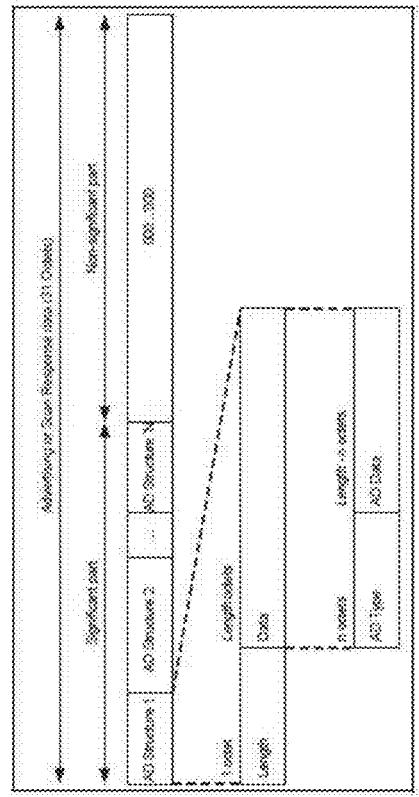

FIG. 5A is an illustration of an example format for the Bluetooth™ Low Energy protocol (BTLE) advertising messages, in accordance with at least one embodiment of the present invention.

Figure 5B:
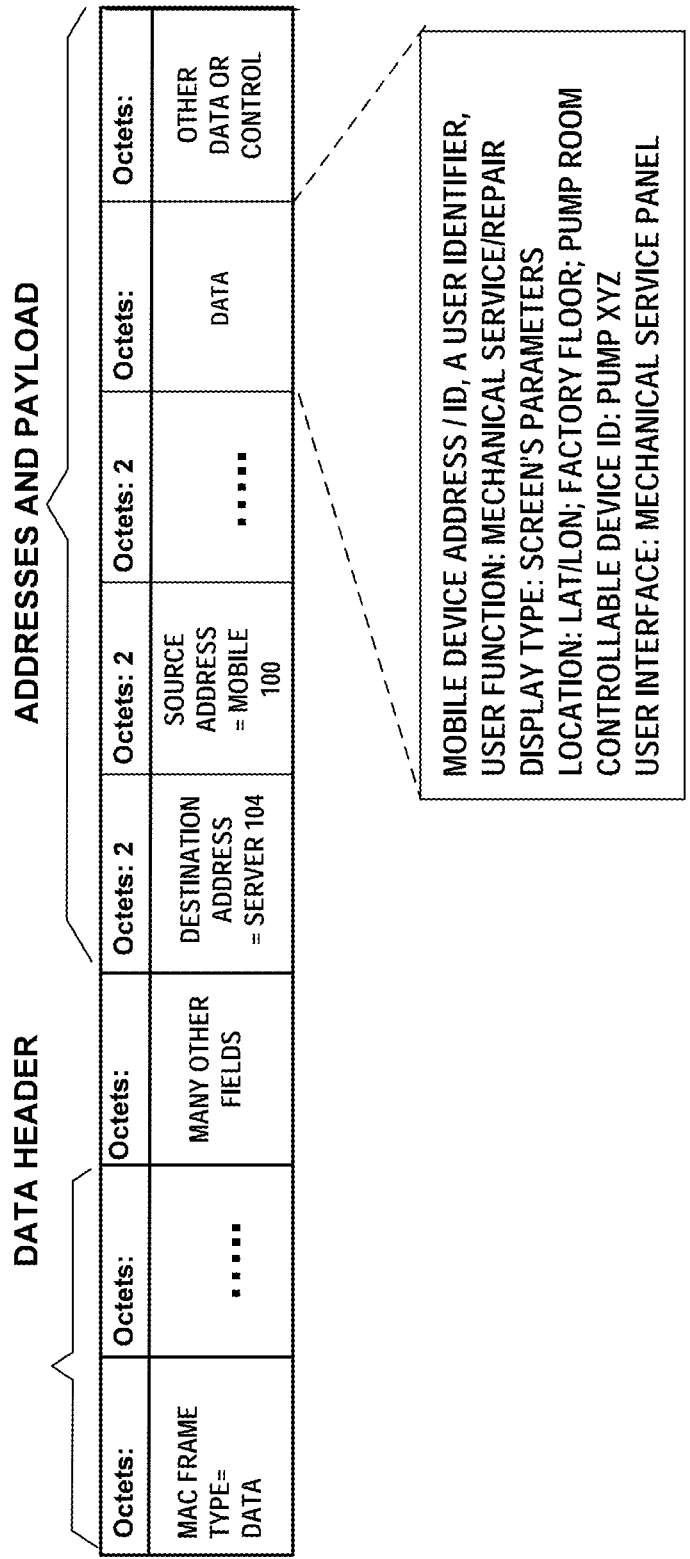

FIG. 5B is an illustration of an example simplified format for a WLAN message sent by the mobile wireless device to the cloud server, its request for the user interface: mechanical service panel.

FIG. 5C is an illustration of an example simplified format for a WLAN message sent by the cloud server to the mobile wireless device, with the user interface: mechanical service panel.

Figure 6:
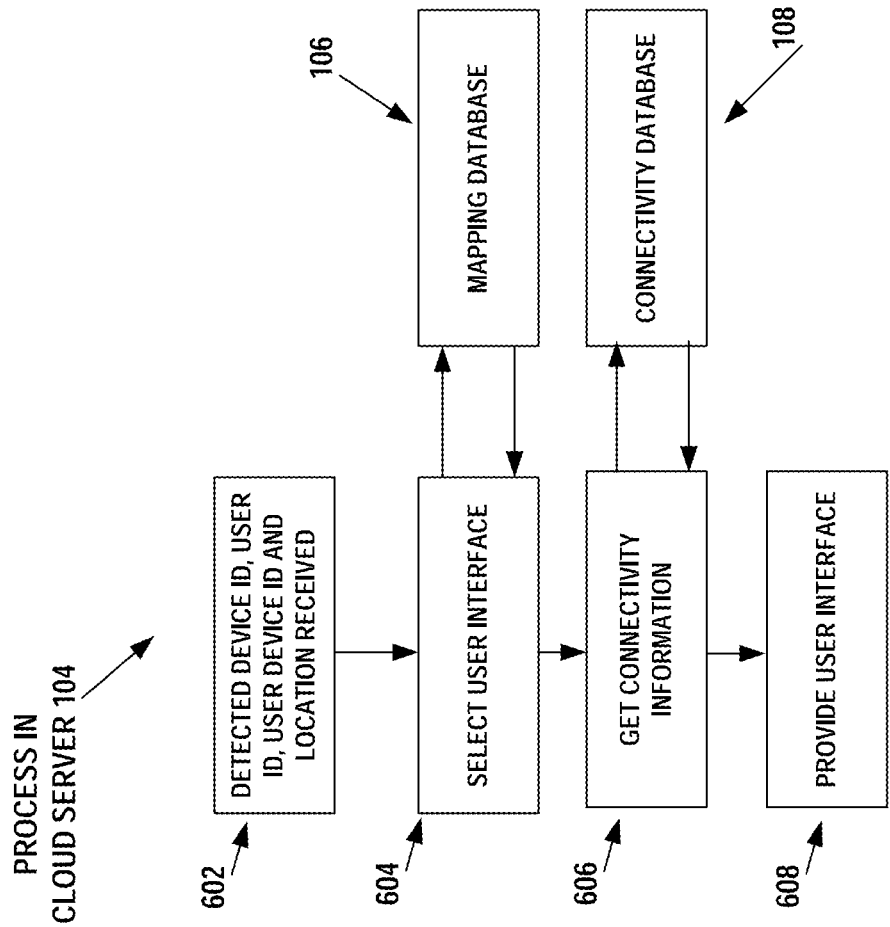

FIG. 6 is an illustration of an example flow diagram of an example process in the cloud server, carrying out the example operations, in accordance with at least one embodiment of the present invention.

Figure 7A:
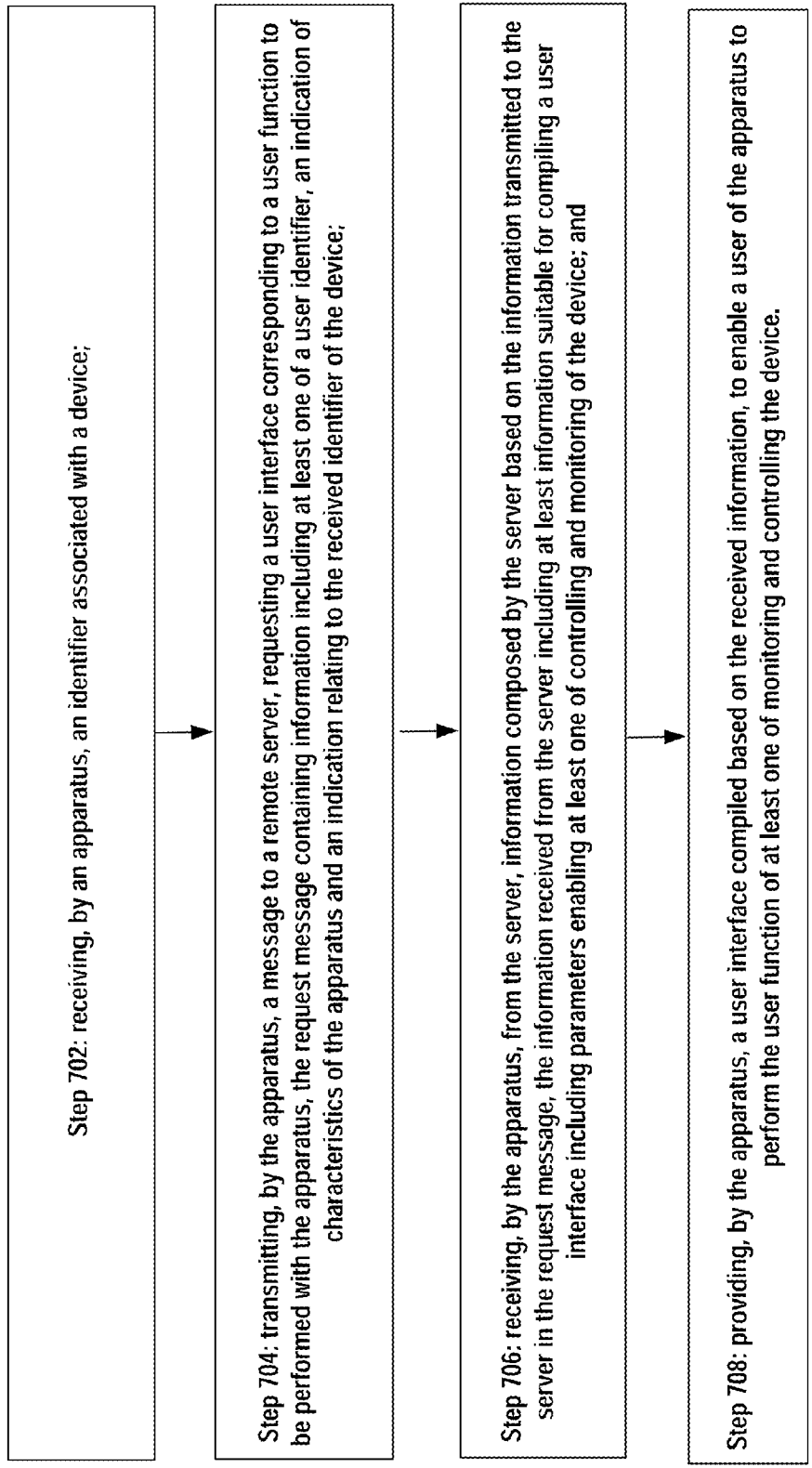

FIG. 7A is an illustration of an example flow diagram of an example process in the mobile wireless device, carrying out the example operations, in accordance with at least one embodiment of the present invention.

FIG. 7B is an illustration of an example flow diagram of an example process in the cloud server, carrying out the example operations, in accordance with at least one embodiment of the present invention.

DISCUSSION OF EXAMPLE EMBODIMENTS OF THE INVENTION

This section is organized into the following topics:
A. Wireless Short-Range Communication Networks
B. Bluetooth™ Low Energy (LE) Technology
C. Touch-to-Select in Bluetooth Technology
D. Cloud Controlled Bluetooth™ Low Energy (LE) Device Wakeup for Local Device Control A. Wireless Short-Range Communication Networks Short-range communication technologies provide communication solutions appropriate for many data applications, without the cost, traffic and legislative concerns of longer-range communication technologies. Popular short-range communication technologies include Bluetooth Basic Rate/Enhanced Data Rate (BR/EDR), Bluetooth Low Energy (LE), IEEE 802.11 wireless local area network (WLAN), IEEE 802.15.4, and near field communication technologies, such as radio frequency identification (RFID) and near field communication (NFC) technology that enable contactless identification and interconnection of wireless devices. Bluetooth Technology provides an example of wireless short-range communication establishment.

B. Bluetooth™ Low Energy (LE) Technology

The Bluetooth™ Core Specification, Version 4.1 includes the Bluetooth LE protocol for products that require lower power consumption, lower complexity, and lower cost than would be possible using the Bluetooth BR/EDR protocol. Bluetooth LE is designed for applications requiring lower data rates and shorter duty cycles, with a very-low power idle mode, a simple device discovery, and short data packets. Bluetooth LE devices may employ a star topology, where one device serves as a master for a plurality of slave devices, the master dictating connection timing by establishing the start time of the first connection event and the slave devices transmitting packets only to the master upon receiving a packet from the master. According to Bluetooth LE communication protocol all connections are point-to-point connections between two devices (the master and the slave).

The Bluetooth LE protocol allows a star network topology in connections, where one device serves as a master for a plurality of slave devices. The master device dictates the connection timing and communication operations of the one or more slave devices. Bluetooth LE communicates over a total of 40 RF channels, separated by 2 MHz. Data communication between Bluetooth LE devices occurs in 37 pre-specified data channels, of the 40 RF channels. All data connection transmissions occur in connection events wherein a point-to-point connection is established between the master device and a slave device. In the Bluetooth LE protocol, a slave device provides data through Bluetooth LE communication to the master device to which it is connected. The remaining 3 channels, of the 40 RF channels, are advertising channels used by devices to advertise their existence and capabilities. The Bluetooth LE protocol defines a unidirectional connectionless broadcast mode on the advertising channels.

The Link Layer provides a state machine with the following five states: Standby State, Advertising State, Scanning State, Initiating State, and Connection State. The Link Layer state machine allows only one state to be active at a time. The Link Layer in the Standby State does not transmit or receive any packets and can be entered from any other state. The Link Layer in the Advertising State will be transmitting advertising channel packets and possibly listening to and responding to responses triggered by these advertising channel packets. A device in the Advertising State is known as an advertiser. The Advertising State can be entered from the Standby State. The Link Layer in the Scanning State will be listening for advertising channel packets from devices that are advertising. A device in the Scanning State is known as a scanner. The Scanning State can be entered from the Standby State. The Link Layer in the Initiating State will be listening for advertising channel packets from a specific device and responding to these packets to initiate a connection with that specific device. A device in the Initiating State is known as an initiator. The Initiating State can be entered from the Standby State. The Connection State of the Link Layer may be entered either from the Initiating State or the Advertising State. A device in the Connection State is known as being in a connection over a data channel. Within the Connection State, two roles are defined: the Master Role and the Slave Role. When a device in the Initiating State, enters the Connection State, it is in the Master Role, it exchanges data packets with a slave device in a data channel, and it defines the timings of transmissions. When a device in the Advertising State, enters the Connection State, it is in the Slave Role and exchanges data packets with a master device in a data channel, wherein the master device defines the timings of transmissions.

The Bluetooth LE radio operates in the unlicensed 2.4 GHz ISM band, in the same manner as does the Bluetooth Basic Rate/Enhanced Data Rate (BR/EDR) radio. Bluetooth LE supports very short data packets, from 10 octets to a maximum of 47 octets, giving it a low duty cycle. Bluetooth LE employs a frequency hopping transceiver with many frequency hopping spread spectrum (FHSS) carriers, with a bit rate of 1 Megabit per second (Mb/s).

Bluetooth LE employs two multiple access schemes: Frequency division multiple access (FDMA) and time division multiple access (TDMA). Forty (40) physical channels, separated by 2 MHz, are used in the FDMA scheme. Three (3) are used as advertising channels and 37 are used as data channels. A TDMA based polling scheme is used in which one device transmits a packet at a predetermined time and a corresponding device responds with a packet after a predetermined interval.

The physical channel is sub-divided into time units known as events. Data is transmitted between Bluetooth LE devices in packets that are positioned in these events. There are two types of events: Advertising and Connection events.

Devices that transmit advertising packets on the advertising Physical Layer (PHY) channels are referred to as advertisers. Devices that receive advertising on the advertising channels without the intention to connect to the advertising device are referred to as scanners. Devices that form a connection to another device by listening for connectable advertising packets, are referred to as initiators. Transmissions on the advertising PHY channels occur in advertising events.

In the Bluetooth™ Core Specification, Version 4.1, there are four advertising event types: connectable undirected advertising (ADV_IND), connectable directed advertising (ADV_DIRECT_IND), scannable undirected advertising (ADV_SCAN_IND), and non-connectable undirected advertising (ADV_NONCONN_IND). At the start of each advertising event, the advertiser sends an advertising packet corresponding to the advertising event type. The header of the advertising channel packet identifies the packet type in a four-bit PDU Type field encoding. There are seven values currently assigned to the four-bit PDU Type field, ranging from 0000 to 0110, with the values 0111 to 1111 being reserved for future use.

The scanner device, also referred to as the initiator device, that receives the advertising packet, may make a connect request (CONNECT_REQ) to the advertiser device on the same advertising PHY channel. The CONNECT_REQ request includes fields for access address AA, CRC, WinSize, WinOffset, Interval, Latency, Timeout, ChannelMap, Hop count, and sleep clock accuracy SCA. The four-bit PDU Type field in the header of the CONNECT_REQ advertising channel packet, is 0101. When the advertiser device accepts the CONNECT_REQ request, a point-to-point connection results between the scanner/initiator device that becomes the master device, and the advertiser device that becomes the slave device in a piconet. The master and the slave devices know at what time and in which frequency the connection is in operation. The data channel changes between every connection event and the start of connection events are spaced regularly with the connection interval that is provided in the CONNECT_REQ packet.

In the connectable undirected advertising (ADV_IND) channel packet, the ADV_IND PDU has a payload field containing AdvA and AdvData fields. The AdvA field contains the advertiser's public or random device address and the AdvData field may contain Advertising data from the advertiser's host. The PDU may be used in connectable undirected advertising events. The four-bit PDU Type field in the header of the ADV_IND advertising channel packet, is 0000.

In the connectable directed advertising (ADV_DIRECT_IND) channel packet, the ADV_DIRECT_IND PDU has the payload field containing AdvA and InitA fields. The AdvA field contains the advertiser's public or random device address. The InitA field is the address of the device to which this PDU is addressed. The InitA field may contain the initiator's public or random device address. The PDU may be used in connectable directed advertising events. This packet may not contain any host data. The four-bit PDU Type field in the header of the ADV_DIRECT_IND advertising channel packet, is 0001.

In a non-connectable undirected event type advertising channel packet, ADV_NONCONN_IND, a scanner device is allowed to receive information in the advertising channel packet, but scanner devices are not allowed to transmit anything in the advertising channels upon receiving the ADV_NONCONN_IND advertising channel packets. When the non-connectable undirected event type is used, non-connectable advertising indications ADV_NONCONN_IND packets are sent by the Link Layer. The non-connectable undirected event type allows a scanner to receive information contained in the ADV_NONCONN_IND from the advertiser. The advertiser may either move to the next used advertising channel index or close the advertising event after each ADV_NONCONN_IND that is sent. The four-bit PDU Type field in the header of the ADV_NONCONN_IND advertising channel packet, is 0010.

In the scannable undirected advertising (ADV_SCAN_IND) channel packet, the ADV_SCAN_IND PDU has the payload field containing AdvA and AdvData fields. The AdvA field contains the advertiser's public or random device address. The PDU may be used in scannable undirected advertising events. The AdvData field may contain Advertising Data from the advertiser's host. The four-bit PDU Type field in the header of the ADV_SCAN_IND advertising channel packet, is 0110.

In the Bluetooth™ Core Specification, Version 4.1, if the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Within a connection event, the master and slave alternate sending data packets using the same data PHY channel.

According to the Bluetooth™ Specification V4.1, Bluetooth LE device discovery involves different operational processes for devices with different roles. In particular:

Slave Device, being an advertiser, performs an advertising process during which the device repeatedly enters Advertising Events. The interval of each start of Advertising Event, Ta, composes of a fixed-length "advInterval" and a random-length "advDelay". In Advertising Event, the device sends advertising Packet Data Units (PDUs) in broadcasting channel 37, 38 and 39, respectively.

Master Device, being an initiator/scanner, performs the initiating/scanning process. An initiating/scanning process consists of repeated "scanInterval", each of which contains a "scanWindow". In a different "scanWindow", the device changes the RF module to receive the state and listens to advertising PDUs on different broadcasting channels; while out of the "scanWindow", it does routine scheduling, or turns off the RF module.

If any advertising PDU is received by an initiator/scanner, it means the initiator/scanner successfully discovers the advertising device. For the initiator, it can directly send back a "CONNECT_REQ" to establish a connection with that advertiser. For a scanner, it can send out a "SCAN_REQ" to ask for more information from that advertiser.

The CONNECT_REQ PDU has a payload field that consists of InitA, AdvA and LLData fields. The InitA field contains the Initiator's public or random device address, as indicated by a transmit address flag. The AdvA field contains the advertiser's public or random device address, as indicated by a receive address flag. The LLData consists of 10 fields, such as the Link Layer connection's Access Address, a channel map, a hop count increment, and other parameters needed to set up the connection.

The SCAN_REQ PDU has a payload field that consists of ScanA and AdvA fields. The ScanA field contains the scanner's public or random device address, as indicated by a transmit address flag. The AdvA field is the address of the device to which this PDU is addressed and contains the advertiser's public or random device address, as indicated by a receive address flag.

Example non-limited use cases for Bluetooth LE technology include sports and fitness, security and proximity and smart energy. Bluetooth LE technology is designed for devices to have a battery life of up to one year such as those powered by coin-cell batteries. These types of devices include watches that will utilize Bluetooth LE technology to display Caller ID information and sports sensors that will be utilized to monitor the wearer's heart rate during exercise. The Medical Devices Working Group of the Bluetooth SIG is also creating a medical devices profile and associated protocols to enable Bluetooth applications for Bluetooth LE devices.

A Bluetooth LE advertising channel may be shared by any number of Bluetooth LE devices. Any number of Bluetooth LE devices may transmit advertising packets while sharing the same three advertising PHY channels. In high-density environments, however, since there are a large number of nodes to be discovered, the probability of broadcasting conflict will inevitably increase, causing network access time to increase, and also lowering the energy efficiency of the whole network.

1. Bluetooth™ LE Discovery:

At the start of each advertising event, the advertiser sends an advertising packet corresponding to the advertising event type. Depending on the type of advertising packet, the scanner may make a request to the advertiser on the same advertising PHY channel which may be followed by a response from the advertiser on the same advertising PHY channel. The advertising PHY channel changes on the next advertising packet sent by the advertiser in the same advertising event. The advertiser may end the advertising event at any time during the event. The first advertising PHY channel is used at the start of the next advertising event.

Initiator devices that are trying to form a connection to another device listen for connectable advertising packets. If the advertiser is using a connectable advertising event, an initiator may make a connection request using the same advertising PHY channel on which it received the connectable advertising packet. The advertising event is ended and connection events begin if the advertiser receives and accepts the request for a connection to be initiated. Once a connection is established, the initiator becomes the master device in a piconet and the advertising device becomes the slave device. Connection events are used to send data packets between the master and slave devices.

The format of Advertising data and Scan Response data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length—1 octet in the Data field depends on the value of the AD type field and is called the AD data. The non-significant part extends the Advertising and Scan Response data to 31 octets and shall contain all-zero octets.

Devices are identified using a device address. Device addresses may be either a public device address or a random device address. A public device address and a random device address are both 48 bits in length. A device shall contain at least one type of device address and may contain both.

The public device address shall be created in accordance with section 9.2 ("48-bit universal LAN MAC addresses") of the IEEE 802-2001 standard (http://standards. ieee.org/getieee802/download/802-2001.pdf) and using a valid Organizationally Unique Identifier (OUI) obtained from the IEEE Registration Authority (http://standardsleee.org/regauth/oui/forms/ and sections 9 and 9.1 of the IEEE 802-2001 specification).

The public device address is divided into the following two fields:
company_assigned field is contained in the 24 least significant bits
company_id field is contained in the 24 most significant bits.

For the purposes of this profile, the random device address may be of either of the following two sub-types:
Static address
Private address The private address may be of either of the following two sub-types:
Non-resolvable private address
Resolvable private address Static and non-resolvable private address both contains address that is random. The main difference is that the device shall not change its static address value once initialized until the device is power cycled.

The random resolvable private device address is divided into the following two fields which can be used to identify the device:
hash field is contained in the 24 least significant bits, as defined in Bluetooth™ Core Specification, Version 4.1 [Vol. 3] Part C, Section 10.8.2.3.
random field is contained in the 24 most significant bits, as defined in Bluetooth™ Core Specification, Version 4.1 [Vol. 3] Part C, Section 10.8.2.2.

2. Bluetooth™ LE Pairing and Bonding

Pairing and key distribution over a BTLE physical link is defined by the Security Manager specification (Bluetooth™ Core Specification, Version 4.1 [Vol. 3], Part II Section 2.3). The pairing process may be initiated if either slave or master device request pairing to enable link encryption and possible authentication.

The purpose of bonding is to create a relation between two Bluetooth devices based on a stored security and identity information. A transport specific key distribution is performed during pairing process to share the keys which can be used to encrypt a link in future reconnections, verify signed data and random address resolution.

LE security uses the following keys and values for encryption, signing, and random addressing:

1. Identity Resolving Key (IRK) is a 128-bit key used to generate and resolve random addresses.

2. Connection Signature Resolving Key (CSRK) is a 128-bit key used to sign data and verify signatures on the receiving device.

3. Long Term Key (LTK) is a 128-bit key used to generate the contributory session key for an encrypted connection. Link Layer encryption is described in Bluetooth™ Core Specification, Version 4.1 [Vol 6] Part B, Section 5.1.3.

4. Encrypted Diversifier (EDIV) is a 16-bit stored value used to identify the LTK. A new EDIV is generated each time a unique LTK is distributed.

5. Random Number (Rand) is a 64-bit stored valued used to identify the LTK. A new Rand is generated each time a unique LTK is distributed.

In order for devices using the privacy feature to reconnect to known devices, the device addresses used when the privacy feature is enabled, private address, must be resolvable to the other devices' identity. The private address is generated using the device's identity key exchanged during the bonding procedure.

The Identity Resolving Key (IRK) is used for resolvable private address construction (see [Part C], Generic Access Profile, Section 10.8.2. A master that has received IRK from a slave can resolve that slave's random resolvable private device addresses. A slave that has received IRK from a master can resolve that master's random resolvable private device addresses. The privacy concept only protects against devices that are not part of the set to which the IRK has been given.

While a device is in the Peripheral or the Central role the device may support the Bonding procedure. While a device is in the Broadcaster or the Observer role the device shall not support the bonding procedure. The Host of the Central initiates the pairing process as defined in Bluetooth™ Core Specification, Version 4.1 [Vol. 3], Part C Section 2.1 with the Bonding_Flags set to Bonding as defined in [Vol. 3], Part H Section 3.5.1. If the peer device is in the bondable mode, the devices shall exchange and store the bonding information in the security database.

If a device has privacy enabled (as defined in Bluetooth™ Core Specification, Version 4.1, Table 10.7), the Host should send it's IRK to the peer device and request the IRK of the peer device during the pairing procedure. The Host can abort the pairing procedure if the authentication requirements are not sufficient to distribute the IRK. If the pairing procedure fails due to authentication requirements and IRK distribution was requested, the pairing procedure should be retried without requesting IRK distribution.

C. Touch-to-Select in Bluetooth Technology

The Bluetooth Touch-to-select feature employs Received Signal Strength Indication (RSSI) information, which is used in determining that a device is within "touch range", i.e. proximate or in close proximity of the inquiring device, and when a threshold for that close proximity is met. This may provide an "intent to share" or "touch to connect" feature.

1. Bluetooth™ RSSI

The received signal strength indicator (RSSI) is a measurement of the power present in a received radio signal. Bluetooth receiver circuits may include an RSSI detector circuit to measure the strength of an incoming signal and generate an output representing the signal strength. For example, the received RF signal may be amplified and downconverted to an intermediate frequency (IF); then channel selection is performed on the IF signal, and the power of the IF signal in the selected channel is measured as the receiver signal strength indicator (RSSI) value. If the Bluetooth receiver circuit supports RSSI, the accuracy may be +/−6 dBm or better.

RSSI Monitoring of Bluetooth LE Packets

During Bluetooth discovery in Bluetooth LE, before a connection is created, the RSSI may be measured from advertising packets received in broadcasting channel 37, 38, or 39, when they are received by a scanning device, if enabled by the host.

When the controller receives an advertising packet, an HCI LE Advertising Report event is sent by the controller to the host application. The HCI LE Advertising Report event indicates that a Bluetooth device or multiple Bluetooth devices have been detected during an active scan or during a passive scan. The HCI LE Advertising Report event includes a parameter N that indicates the RSSI of the received packet, with N being one octet representing the magnitude of the RSSI, with a range in units of dBm of −127≤N≤+20. This event will be sent from the Controller to the Host as soon as an advertising packet from a remote device is received. The RSSI parameter is measured during the receipt of the advertising packet. This event contains RSSI and advertising packet data for the remote device, among other information.

RSSI Monitoring of Data Packets Received Over a Connection

After the discovery phase is completed, once a Bluetooth LE device is connected to another Bluetooth device, the received signal strength indication (RSSI) may be used by a receiving device to monitor the received power level of the data communication packets received over the connection. The RSSI value is calculated from received packet in the Bluetooth physical layer, and may be read by the host application for example through the host controller interface (HCI) Read RSSI command, for example once per second.

The Read RSSI Command will read the value of the received signal strength indication (RSSI) for data communication packets received over the connection to another Bluetooth LE controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

In Bluetooth LE, the meaning of the RSSI metric is an absolute receiver signal strength value in dBm to ±6 dBm accuracy. If the RSSI cannot be read, the RSSI metric is set to 127.

Measuring Pathloss with the RSSI and the TX Power Level

The TX Power Level data field in the Bluetooth LE advertising packet indicates the transmitted power level of the advertising packets at the transmitter of the sending device. The TX Power Level is reported to the host in response to the HCI LE Read Advertising Channel Tx Power Command. The TX Power Level data field may be used to calculate path loss of a received packet when the receiving device measures the RSSI of the received advertising packet, using the following equation:

$$\text{pathloss} = Tx \text{ Power Level} - RSSI \text{ of the inquiry response packet}$$

For example, if Tx Power Level=+4 (dBm) and the RSSI on the received packet is −60 (dBm) then the total pathloss is +4−(−60)=+64 dB. If a second packet were received at −40 dBm with a Tx Power Level data=+15 dBm the resulting pathloss would be +55 dB. An application may use these pathloss values to choose which device it thinks might be closer (the one with the lower pathloss value).

Unfortunately, due to fading and varying antenna, circuit, and chip characteristics, these resulting pathloss values may have some uncertainty. Some of the uncertainty (for example, due to fading) may be able to be alleviated if multiple packets are received from the same device.

2. Bluetooth™ Host Controller Interface

The Bluetooth™ radio in a device may include the host controller interface that provides a command interface between the host application in the device and the link layer of the Bluetooth™ radio, also referred to as the controller, to enable access to hardware status and control registers of the Bluetooth™ radio.

The host controller interface (HCI) is described in the Bluetooth™ Core 4.0 Specification. The Host will receive asynchronous notifications of HCI events from Host Controller Transport Layer. HCI events are used for notifying the Host when something occurs. When the Host discovers that an event has occurred, it will then parse the received event packet to determine which event occurred. The commands and events are sent between the Host and the Controller. These are grouped into logical groups by function.

The HCI provides a command interface between the host application in a device and the Bluetooth™ link layer, provides access to hardware status and control registers of the Bluetooth™ radio, and provides a uniform method of accessing the Bluetooth™ baseband capabilities.

Discovery Phase HCI Commands and Events

HCI LE Advertising Report Event

The Bluetooth LE device discovery group of commands and events allow a device to discover other devices in the surrounding area. The Bluetooth LE host controller interface includes the HCI LE Advertising Report event that indicates that a Bluetooth device or multiple Bluetooth devices have been detected during an active scan or during a passive scan.

The scanning device may ask further information of advertising device with scan request packet. Once advertiser has received scan request packet it may answer with scan response packet.

Connection Phase HCI Commands and Events

HCI LE Read Advertising Channel Tx Power Command

The TX Power Level is reported to the host in response to the HCI LE Read Advertising Channel Tx Power Command. The TX Power Level data field may be used to calculate path loss of a received packet when the receiving device measures the RSSI of the received advertising packet.

After the discovery phase is completed, once a Bluetooth device is connected to another Bluetooth device, the received signal strength indication (RSSI) may be used by a receiving device to monitor the received power level of the data communication packets received over the connection. The RSSI value is calculated by the Bluetooth physical layer, and may be read by the host application through the host controller interface (HCI) Read RSSI command.

The Read RSSI command will read the value of the received signal strength indication (RSSI) for data communication packets received over the connection to another Bluetooth controller. The RSSI value is referenced with respect to a Connection_Handle that identifies the connection and is assigned when the connection is created. The Connection_Handle is used by the Bluetooth controller to determine which set of buffers to use and the logical link over which the data is to be sent.

The RSSI parameter in the Read RSSI command is a signed 8-bit value, and is interpreted as an indication of arriving signal strength at the antenna measured in dBm. This command reads the Received Signal Strength Indication (RSSI) value from the Controller. For Bluetooth LE transport, a Connection_Handle is used as the Handle command parameter and return parameter. The meaning of the RSSI metric is an absolute receiver signal strength value in dBm to ±6 dBm accuracy.

3. Bluetooth LE Proximity Profile

The Proximity Profile defines the behavior when a device moves away from a peer device so that the connection is dropped or the path loss increases above a preset level, causing an immediate alert. This alert may be used to notify the user that the devices have become separated. As a consequence of this alert, a device may take further action, for example to lock one of the devices so that it is no longer usable.

The Proximity Profile may also be used to define the behavior when the two devices come closer together such that a connection is made or the path loss decreases below a preset level.

The Proximity Profile defines two profile roles to enable devices to detect their proximity: the Proximity Reporter and the Proximity Monitor. The Proximity Reporter is a Generic Attribute Profile (GATT) server on the one device in the connection, which supports a Link Loss Service (mandatory), an Immediate Alert Service (optional), and a transmit (Tx) Power Service (optional). The Proximity Monitor is a GATT client on the peer device in the connection, which monitors the Radio Signal Strength Information (RSSI) of the connection to calculate the signal's path loss. The Proximity Monitor may use the information received from the Proximity Reporter's Tx Power Service to normalize the RSSI value, by subtracting the RSSI from the Tx Power Level. In order to trigger an alert on low RSSI, the Proximity Monitor constantly monitors RSSI.

The Proximity Monitor on one device may maintain a connection with the Proximity Reporter on the peer device and monitor the RSSI of this connection. The Proximity Monitor may calculate the path loss by subtracting the RSSI from the transmit power level of the device of the Proximity Reporter, as discovered using the Reading Tx Power procedure. If the path loss exceeds a threshold set on the Proximity Monitor, it may write in the Alert Level characteristic of the Immediate Alert service, using the GATT Write Without Response sub-procedure, to cause the Proximity Reporter to generate an alert. The Proximity Monitor may also generate an alert when the path loss exceeds the threshold. The duration of the alert may be implementation specific.

The Proximity Monitor specified in the Bluetooth Proximity Profile, may include the following functions:
Service Discovery from the peer device;
Characteristic Discovery from the peer device;
Configuration of Alert on Link Loss to the peer device;
Alert on Link Loss to the peer device;
Reading Tx Power from the peer device; and
Alert on Path Loss locally and to the peer device based on RSSI supervision.

If the path loss falls below a threshold set on the Proximity Monitor it may write in the Alert Level characteristic of the Immediate Alert service, using the GATT Write Without Response sub-procedure, to cause the Proximity Reporter to end the alert. When the path loss is below the threshold the Proximity Monitor should stop alerting.

If link loss occurs during this procedure, then the behavior defined in the Alert on Link Loss procedure may be used.

D. Cloud Controlled Bluetooth™ Low Energy (LE) Device Wakeup for Local Device Control Users may monitor the operation of devices, machines, and systems by viewing a visual display of monitoring images, such as icons on a computer display screen, representing signals received from physical sensors connected to or interacting with the devices, machines, and systems. Such physical sensors may include ambient light sensors, microphones, location sensors, motion tracking sensors, magnetic sensors, and the like. A user interface program in the user's computer must be provided with the correct parameters to condition and format the received signals so as to be properly displayed on the computer display screen.

Users may control the operation of such devices, machines, and systems thus monitored, by means of selecting an icon or item on a menu displayed on the computer display screen, to cause the computer to transmit signals to physical actuators connected to or interacting with the devices, machines, and systems. Such physical actuators may include relays for electrical switches, solenoids, and electric motors. The user interface program in the user's computer must be provided with the correct parameters to condition and format the transmitted signals so that the physical actuators are properly activated.

Wireless communication protocols, such as Bluetooth Basic Rate/Enhanced Data Rate, Bluetooth Low Energy, WLAN, and the like, have been used for the communication of signals by a user's computer to monitor and/or control devices, machines, and systems in a residence, such as room lights, home heating systems, surround-sound systems, washing machines, refrigerators, coffee makers, and the like, belonging to Internet of Things. Such wireless communication protocols have been used for the communication of signals by a user's computer to monitor and/or control devices, machines, and systems in commercial or industrial applications, for heavier machinery such as elevators, AC drives, air conditioners, pumps, valves, escalators, security controls such as movement detectors, heat pumps, engines, street lamps, switches, fuse boards, fire alarms, and the like.

There is a need for improved controls for devices, machines, and systems in residential, commercial, and industrial applications, which are reconfigurable to adapt to design changes and which have an increased useful life. Moreover, there is a need to provide a level of security in controls for devices, machines, and systems to prevent unauthorized use. Still further, there is a need to make user interfaces user friendly, providing help, guidance and language options.

In accordance with an example embodiment of the invention, a cloud server provides a user interface to a user's mobile wireless device, based on a detected proximity between the mobile wireless device and a controllable device to be monitored and/or controlled. The user interface may be a display panel including icons and menus, and also including parameters to condition and format the transmitted and received signals.

In one example embodiment of the invention, the mobile wireless device detects Bluetooth™ Low Energy protocol (BTLE) advertising messages from the wireless controllable device and is able to transmit to the cloud server, a public or random device address of the detected device or other identification. The cloud server responds with a user interface, based on the detected proximity, enabling monitoring and/or control of the controllable device.

In another example embodiment of the invention, the mobile wireless device transmits its current location to the cloud server. The cloud server responds with one or more user interfaces, based on the current location, for one or more controllable devices in the area of the mobile device's current location, enabling monitoring and/or control of one or more controllable devices.

In an example embodiment of the invention, the mobile wireless device may indicate its access level and what control components need be shown to the user. For example, the owner of the controllable device may have more control than a visitor. An elevator maintenance person may need a maintenance view, whereas an ordinary user of the elevator needs only the floor selection buttons. The cloud server composes a user interface corresponding to the access level and control components needed by the user, and provides it to the mobile wireless device, to enable access to the controllable device.

In an example embodiment of the invention, the mobile wireless device may be required to submit access authorization credentials to the cloud server. In response, the cloud server composes a user interface including the required access credentials and provides them to the mobile wireless device, to enable access to the controllable device.

In an example embodiment of the invention, the cloud server may access a mapping database to obtain the user interface information for the controllable devices. There may be the same or a different database that the cloud server accesses for connectivity information to enable communication between the mobile wireless device and a controllable device. For example, the cloud server may determine that a specific controllable device needs to be accessed over a specific communications protocol Bluetooth, or WLAN, or NFC, or through the Internet. The access method may also be dependent on the user's access level or time of day or other factor. The cloud server composes a user interface corresponding to the required communications protocol, access method, user's access level, time of day, or other factor, and provides them to the mobile wireless device, to enable access to the controllable device.

In an example embodiment of the invention, the user interface display layout and functionality may be dynamically changed by the cloud server, based on a measured proximity between the devices. At a greater distance, there may be a different user interface provided by the cloud server, than when the devices are in close proximity. As an example, when the user is in an elevator lobby area, only the call buttons for the elevator need to be displayed, whereas when entering the elevator, the user interface may change automatically to show the current floor and the elevator alarm button.

In an example embodiment of the invention, the user interface may allow control of a plurality of controllable devices at the same time. This enables use cases where for example, the user interface combines information from several different controllable devices when the user is further away from the devices. If user moves closer to any of the controllable devices, the user interface may be changed by the cloud server, to focus on that particular device.

In an example embodiment of the invention, the user interface may be preloaded into a cache of the mobile wireless device from the cloud server, to enable offline use of the user interfaces. Individual ones of the user interfaces in the cache may be invoked when a corresponding controllable device is detected to be in proximity. Offline use may be enabled on a per user, per area, per controllable device, or per time basis. When this is enabled, the mobile device may refresh all offline user interfaces when it is connected to a network, such as the internet.

In an example embodiment of the invention, security of the user interface control is enhanced by setting the Bluetooth radios of the controllable devices into a non-discoverable mode, so that the radios only listen for specific advertisements until receiving an advertising message from a mobile wireless device, containing a specific encryption code provided by the cloud server.

1. The Group of FIGS. 1 to 1G Illustrates an Example Security Enhancement to the Example Embodiment Shown in the Group of FIGS. 2A to 2G to Make the User Interface Control Concept More Secure.

To improve security, the controllable wireless device may want to stay completely hidden until awakened by an authorized entity. This makes attacking more difficult since the attacker may be unaware of the target being reachable. This saves radio bandwidth by not sending unnecessary advertisements, and makes device selection easier for devices not interested in the hiding device, since they will have fewer choices.

In accordance with an example embodiment of the invention, the mobile wireless device with a user account, connects to the cloud server. The cloud server determines the location of the mobile wireless device, for example based on geolocation coordinates received for the mobile wireless device, and what possible controllable devices may be in the vicinity of the mobile wireless device, which it is allowed to access.

In accordance with an example embodiment of the invention, based on the available information, the cloud server prepares, for each accessible controllable device, a message object encrypted with the controllable device's first public key. The message object may contain, for example, a sequence number and access rights for the control device. The cloud server then passes the encrypted object to the mobile wireless device, accompanied by a second public key of the controllable device. The controllable device's first public key corresponds to a first private key (or secret key) of a first public key/private key pair of the controllable device's. The controllable device's second public key corresponds to a second private key (or secret key) of a second public key/private key pair of the controllable device's.

In accordance with an example embodiment of the invention, the mobile wireless device then prepares a message containing the encrypted message object and the mobile wireless device's identifier, and then encrypts that message with the received second public key. The mobile wireless device then sends the resulting encrypted message, using a Bluetooth LE advertisement packet. The advertisement packet may, at this point, include the public key of the mobile wireless device, or other secret token. The advertisement packet may include one or more encrypted messages targeted to one or more controllable devices.

In accordance with an example embodiment of the invention, the controllable device receives the advertisement packet and decrypts the message with its second private key, in order to obtain the encrypted object and the mobile wireless device's identifier (and possibly other secrets). The controllable device then decrypts the encrypted object with its first private key.

In accordance with an example embodiment of the invention, the controllable device then determines if the mobile wireless device is allowed to access the controllable device (for example, by assessing validity of the included sequence number). If it is allowed, then the controllable device starts sending BTLE advertisements that enable the mobile wireless device to actually make a connection to the controllable device. The determination whether the controllable device starts the advertising, may also include additional steps, such as measuring a Received Signal Strength (RSSI) of the signals received from the mobile wireless device. The controllable device may start advertising its presence only if the RSSI is above some threshold level. If it is not above the threshold, the controllable device sends nothing and stays hidden, for example, by not advertising its presence with BTLE advertisements. In accordance with an example embodiment of the invention, it is also possible that the controllable device is creating a connection to the mobile device, which is allowed to access the controllable device. Hence, the controllable device does not need to start an advertisement, but may directly create a connection with the mobile device.

FIG. 1 is an illustration of an example embodiment of a message flow for a cloud-controlled Bluetooth LE device wakeup of a controllable device. The controlled device 102 initially stays hidden, not advertising its presence, in accordance with at least one embodiment of the present invention.

For message 200 of the message flow, the mobile wireless device 100 transmits a WLAN or cell phone message over a secure channel, to the cloud server 104, to inform the cloud server of the current location of the mobile wireless device 100. Message 200 is also shown in FIG. 1B. To maintain security, the mobile wireless device 100 may be required to submit access authorization credentials to the cloud server 104, showing authorization to securely obtain information about any available controllable devices 102 that may be near to the current location of the mobile wireless device 100.

For message 201A of the message flow, the cloud server 104 issues a query to the mapping database 106, for the identity of any available controllable devices 102 that may be near to the current location of the mobile wireless device 100. Message 201A is also shown in FIG. 1B.

For message 201B of the message flow, the mapping database 106 replies to the cloud server 104, with information about at least one available controllable device 102 that is near to the current location of the mobile wireless device 100. The information provided by the mapping database 106 to the cloud server 104 may include information about the controllable device 102, a first public key of the controllable device 102, a second public key of the controllable device 102, a sequence number, and a user access profile for the mobile wireless device 100. Message 201B is also shown in FIG. 1B.

The cloud server computes an encrypted object by using the first public key of the controllable device 102 to encrypt the sequence number and the user access profile for the mobile wireless device 100.

For message 202 of the message flow, the cloud server 104 transmits WLAN or cell phone message over a secure channel, to the mobile wireless device 100 the encrypted object and the second public key of the controllable device 102. Message 202 is also shown in FIG. 1B.

The mobile wireless device 100 uses the second public key of the controllable device 102 to encrypt the encrypted object.

For message 204 of the message flow, the mobile wireless device 100 transmits one or more Bluetooth LE advertisement message 204 containing the encrypted object that has been further encrypted with the second public key of the controllable device 102. Message 204 is also shown in FIG. 1C.

The Bluetooth LE advertisement message 204 is received by the controllable device 102. The Bluetooth radio of the controllable device 102 is in a non-discoverable mode 180, so that the radio only listens for specific advertisements until receiving an advertising message 204 containing the specific encryption code.

The controllable device 102 processes the received advertisement message 204 as shown in FIG. 1A.

In step 208, receives the advertisement message 204.

In step 210, controllable device 102 decrypts the advertisement message 204 using the second private key of the controllable device 102, recovering the first public key. If this fails, step 211 silently drops the advertisement 204.

In step 212, controllable device 102 decrypts the encrypted object using the first private key of the controllable device 102, recovering the sequence number and the user access profile for the mobile wireless device 100. If this fails, step 213 silently drops the advertisement 204.

In step 214, controllable device 102 assesses the validity of the sequence number. If this fails, step 215 silently drops the advertisement 204.

In step 216, controllable device 102 starts sending the Bluetooth LE advertisements 150 containing a description of the controllable device capabilities, as shown in FIG. 2A.

FIG. 1B is an illustration of an example embodiment of the network of FIG. 2B, wherein the mobile wireless device 100 is shown sending to the cloud server 104, a message for example over a WLAN or cellular connection, 200 over a secure channel, containing an update of the current location of the mobile wireless device 100 (for example, its latitude and longitude, and environment, such as a factory floor and pump room) and its request for available controllable devices in its area.

In example embodiments of the invention, the wireless mobile device 100 may include a processor 122 that includes from one to many central processing units (CPUs) 124, a random access memory (RAM), a read only memory (ROM), a Received Signal Strength Indication (RSSI) to distance conversion module 129, and interface circuits to interface with one or more radio transceivers 116, antenna 132, 170, and battery or house power sources. The wireless mobile device 100 also includes cell phone circuits 131 and Internet circuits. A smart phone may include a keypad, display 145, etc. The RAM and ROM can be removable memory devices 126 such as smart cards, SIMs, WIMs, semiconductor memories such as RAM, ROM, PROMS, flash memory devices, etc., as shown in FIG. 3.

In an example embodiment of the invention, the mobile wireless device 100 includes a Bluetooth™ Low Energy protocol (BTLE) 114 module. The mobile wireless device 100 may include a WLAN communications protocol 115 module, such as the IEEE 802.11 communications protocol.

In example embodiments of the invention, the cloud server 104 may include a processor 122 that includes from one to many central processing units (CPUs) 124, a random access memory (RAM) and a read only memory (ROM) 126, and interface circuits to interface with one or more radio transceivers 116, antenna 172, and battery or house power sources. The server 104 may also include cell phone circuits 131. The RAM and ROM can be removable memory devices 126 such as smart cards, SIMs, WIMs, semiconductor memories such as RAM, ROM, PROMS, flash memory devices, etc., as shown in FIG. 3. In an example embodiment of the invention, the RAM in the server 104 may store information contained in received messages 160. In an example embodiment of the invention, the server 104 may include a WLAN communications protocol, such as the IEEE 802.11 communications protocol.

In example embodiments of the invention, the cloud server 104 may not necessarily have any radio or any cell phone circuits, as the cloud server may not necessarily have any understanding of cellular networks. The cloud server may simply be in a datacenter connected through wired internet access. Thus, any kind of communication technologies may be used for the cloud server. In example embodiments of the invention, the "cloud server" may be quite local to the mobile device, and hence it may directly have radio access.

The FIG. 1B shows the cloud server 104, in response, accessing the database 106 to retrieve information about a controllable device 102 in the area of the mobile wireless device 100, the information including a first public key and a second public key of the controllable device 102, a sequence number, and a user access profile of the mobile wireless device 100. The figure shows the cloud server 104 transmitting to the mobile wireless device 100, a reply message 202 including at least the second public key and an encrypted object formed by the first public key encrypting at least the sequence number and user access profile, in accordance with at least one embodiment of the present invention.

In an example embodiment, the message 200 may be an optional step, wherein the server 104 may be aware of the location of the mobile wireless device 100 via some other means (such as via tracking services or positioning systems).

In this example embodiment, the server may push the "reply message" without explicitly being solicited by the mobile wireless device.

FIG. 1C is an illustration of an example embodiment of the network of FIG. 2A, wherein the mobile wireless device 100 transmits to the controllable device 102, one or more Bluetooth™ Low Energy protocol (BTLE) advertisement messages 204 containing the encrypted object and the user ID that have been further encrypted with the second public key of the controllable device 102, wherein the encrypted object is at least the sequence number and user access profile, encrypted with the first public key of the controllable device 102, in accordance with at least one embodiment of the present invention.

FIG. 1D is an illustration of an example embodiment of the network of FIG. 1C, wherein the controllable device 102 decrypts the advertisement message 204 and the encrypted object, to assess the validity of the sequence number and the user access profile. If the controllable device 102 determines that the sequence number and/or the user access profile are valid, then the controllable device 102 reveals its presence by transmitting a BTLE advertisement 150, such as in FIG. 2A and FIG. 5A, containing information identifying the controllable device, in accordance with at least one embodiment of the present invention.

There are further embodiments possible, at least:
The controllable device may send Bluetooth LE advertisements, when it has accepted wakeup, as directed Bluetooth LE advertisement meant only for the device from whom triggering advertisement was received.
The controllable device may send Bluetooth LE advertisements encrypted with 2nd private key, and hence decodable only by those in possession of 2nd public key.
The mobile wireless device may include its public key inside the Bluetooth LE advertisement it sends. This would allow controllable device to encrypt Bluetooth LE advertisement it sends in a way that only correct mobile wireless device is able to decrypt it.
In one embodiment the communication between mobile wireless device and controllable device are either based on directed advertisements, or some other form of unicast messaging. For example, the cloud server may in one embodiment tell the device address of the controllable device, and that allows mobile wireless device to directly establish Bluetooth LE connection to the controllable device. In unicast cases the cloud would provide information to mobile wireless device that allows it to form unicast messages that the controllable device can validate and selectively respond only if validation is successful.

Although the presence of the controllable device in the example is explained to be advertised over BTLE, it can be any other technology. Also, the presence may be indicated over BTLE but the actual connectivity is done over some other technology. Non-limiting examples includes:
The controllable device starts a mobile hotspot or Wi-Fi Direct.
The mobile wireless device may for example receive access credential from remote server or via BTLE advertisement.
The controllable device connects to AP.
It may advertise its IP address over BTLE or using for example Bonjour over WLAN network.
The controllable device creates cellular connection and advertises its connectivity information over BTLE.

The location update from mobile wireless device to cloud may be periodic, may be triggered by explicit user action such as pressing of "scan for devices" button, or it may be triggered, for example, by positioning beacon message (for example, in a space there can be iBeacon, or any positioning beacon message, which triggers sending of the positioning update to the cloud). It is also possible that mobile wireless device does not send explicit location update to cloud, but cloud obtains position of mobile wireless device by some other means (for example, from an indoor positioning system). A position of the device may be obtained by any means.

The database may reside on the same server to where mobile wireless device sends its location update, but it is possible that database is distributed, for example, that different databases are used based on user account or based on device types or based on locations. Database technology may be relational database like SQL, noSQL, text files, key-value stores, object database, or alike. Databases may also have reference to further databases.

Log and/or charging data records may be stored on the same database or to different database.

While the above description is in terms of asymmetric public-key encryption using public and private (or secret) keys, other encryption means are also possible. In particular, symmetric key cryptography is also a possibility (where the same key is used for decryption and encryption). The encryption keys may be public or private keys.

Furthermore, the cloud server may pass new keys to the controllable device, embedded into the Encrypted Object (or in parallel with the Encrypted Object as a separate part of the message). In many systems, encryption keys may expire and need to be periodically refreshed.

During the first time setup, the mobile wireless device may provide keys to the controllable device and update respective keys to the cloud server. This first time setup may be initiated with a certain button press or with certain a RSSI requirement between the mobile wireless device and the controllable device, in a situation where there are no keys existing in the controllable device.

Advantages:
1. Device is hidden until made visible with properly formatted Bluetooth LE advertisement
2. Device can be woken up only with cloud provided Encrypted Object
3. Attacker seeing successful wakeup message cannot replay it, because Encrypted Object contains changing sequence number (which may be very short lived)
4. Mobile wireless device cannot repeatedly use the controllable device without obtaining fresh Encrypted Object from the cloud
5. Cloud is fully in control who talks to controllable device and how many connections are created (this is beneficial e.g. for charging purposes). This is enabled by cloud server keeping the device's first public key secret.
6. Secure wakeup without requiring changes to existing smartphones and tablets (i.e. the mobile wireless device can be implemented on currently available devices)
7. Proprietary software for the controllable device and cloud for handling the Encrypted Object formation and encryption
8. Solution can be implemented in application on top of existing mobile wireless devices (Android, iOS, Windows Phone) systems without changes. This allows fast deployment.

FIG. 1E is an illustration of an example flow diagram 300 of an example process in the mobile wireless device 100, carrying out the example operations, in accordance with at least one embodiment of the present invention. The steps of the flow diagram represent computer code instructions stored in the RAM and/or ROM memory of the device, which when executed by the central processing units (CPU) 124, carry out the functions of the example embodiments of the invention. The steps may be carried out in another order than shown and individual steps may be combined or separated into component steps. The flow diagram has the following steps:

Step 302: receiving, by an apparatus, from a remote server, a message including information about at least one device, the message including a second encryption key of the at least one device and an encrypted object encrypted with a first encryption key of the at least one device;

Step 304: transmitting, by the apparatus, an encrypted message that includes the encrypted object, encrypted with the second encryption key of the at least one device; and Step 306: receiving, by the apparatus, from the at least one device, a message identifying or describing the at least one device, only if the at least one device has determined that the message transmitted by the apparatus is valid.

FIG. 1F is an illustration of an example flow diagram 330 of an example process in the cloud server 104, carrying out the example operations, in accordance with at least one embodiment of the present invention. The steps of the flow diagram represent computer code instructions stored in the RAM and/or ROM memory of the device, which when executed by the central processing units (CPU) 124, carry out the functions of the example embodiments of the invention. The steps may be carried out in another order than shown and individual steps may be combined or separated into component steps. The flow diagram has the following steps:

Step 332: updating, by a server, a current location of a wireless device;

Step 334: accessing, by the server, a database to obtain data relating to available devices near the current location, the data including a first encryption key and a second encryption key of at least one device near the current location, and a user access profile of the wireless device;

Step 336: computing, by the server, an encrypted object formed by the first encryption key encrypting at least the user access profile of the wireless device; and Step 338: transmitting, by the server, to the wireless device, a message in response to the update, the message including information about the at least one device, including at least the second encryption key and the encrypted object.

FIG. 1G is an illustration of an example flow diagram 360 of an example process in the controllable device 102, carrying out the example operations, in accordance with at least one embodiment of the present invention. The steps of the flow diagram represent computer code instructions stored in the RAM and/or ROM memory of the device, which when executed by the central processing units (CPU) 124, carry out the functions of the example embodiments of the invention. The steps may be carried out in another order than shown and individual steps may be combined or separated into component steps. The flow diagram has the following steps:

Step 362: receiving, by an apparatus, from a wireless device, an encrypted message that includes at least an encrypted object, encrypted with a second public key of the apparatus;

Step 364: decrypting, by the apparatus, the encrypted message using a second private key and decrypting the encrypted object with a first private key, to recover at least a user access profile of the wireless device;

Step 366: assessing, by the apparatus, validity of at least the user access profile; and Step 368: transmitting, by the apparatus, to the wireless device, a message identifying or describing the apparatus, only if the apparatus has determined that at least the user access profile is valid.

2. The Group of FIGS. 2A to 2G Illustrates an Example of a Cloud Server Providing a User Interface (UI) Based on a Detected Proximity Between a Mobile Wireless Device and a Controllable Device.

FIG. 2A is an illustration of an example embodiment of a network with a mobile wireless device 100 and a controllable device 102, which is shown in the figure as the pump XYZ. Other examples of controllable devices 102 may include, in a residence, room lights, home heating systems, surround-sound systems, washing machines, refrigerators, coffee makers, and the like, belonging to Internet of Things. Other examples of controllable devices 102 may include, in commercial or industrial applications, heavy machinery such as elevators, AC drives, air conditioners, pumps, valves, escalators, security controls such as movement detectors, heat pumps, engines, street lamps, switches, fuse boards, fire alarms, and the like.

Other examples of controllable devices 102 may include healthcare and medical equipment in a hospital or similar setting. As an example, a nurse may be provided with diverse user interface display screens corresponding to general treatment or to more specifically prescribed medications. The display screens for a nurse may typically be different from the display screens for an attending physician, with the physician's screen corresponding to current medication and vital signs, or describing the effectiveness of a prescribed medication and presenting alternate medications. The user interface display screens may be displayed when the nurse or physician approaches the patient's medical monitoring equipment or the patient's bed. In accordance with an example embodiment of the invention, the patient monitoring devices are not responsive unless detecting that a nurse or an attending physician is in close proximity, so that visitors do not get any sensitive information. A further example is where a nurse enters a room occupied by several patients. The nurse may be presented with a combined user interface identifying several of the patients that need medication. The user interface may be invoked by the nurse's mobile wireless device being proximate to an entrance tag located at the entrance to the room, to display information about several or all of the patients in the room. In a "closed" environment of a hospital, a "remote server" and the entire infrastructure, including servers, may be within the closed hospital environment, so there may be no communication outside the hospital's closed intranet network. Accordingly, data may be preloaded from the hospital's servers, into the nurse's and physician's mobile wireless devices when they arrive on duty, since the nurses and physicians typically have certain responsibility areas that are very specific, such as a specific ward where their patients and the medical equipment are located.

The mobile wireless device 100 is shown scanning for Bluetooth™ Low Energy protocol (BTLE) advertising messages. The controllable device 102 is shown transmitting BTLE advertising messages 150 containing at least identification of the controllable device.

Advertising messages 150 may be the connectable undirected advertising (ADV_IND) channel packet. The ADV_IND PDU has a payload field containing AdvA and AdvData fields. The AdvA field contains the controllable device's 102 public or random device address and the AdvData field may contain Advertising data shown in FIG. 5A. When the controllable device 102 in the advertising state, enters the BTLE connection state, it will be in the BTLE slave role and the scanning mobile wireless device 100 will be in the BTLE master role in a BTLE data channel, in accordance with at least one embodiment of the present invention.

In example embodiments of the invention, the controllable device's identifier may be a periodically changing random device address, as provided by the Bluetooth™ Low Energy protocol (BTLE) communication protocol, to protect privacy and prevent replay attacks.

In example embodiments of the invention, instead of an address of a controllable device 102, another form of identifier for the controllable device 102 may be used, such as Uniform Resource Name, Uniform Resource Identifier, serial number, or the like.

The user device may access the cloud server 104 with the current location of the mobile wireless device 100, which is proximate to the controllable device 102. The cloud server 104 may then query a mapping database 106 in FIG. 2C, and access the device address or identity of the proximate controllable device 102.

The current location of the mobile wireless device 100 may be determined by:

The mobile wireless device 100 provides location (relative/absolute) information to server;

The mobile wireless device 100 determines location from (local) positioning system;

The mobile wireless device 100 receives positioning data from the controllable device during a touch-to-select event; or The cloud server 104 determines the location of the mobile wireless device from external position sensing sources.

In an alternate example embodiment of the invention, the mobile wireless device 100 may receive the device identifier of the controllable device 102 from the remote server 104. For example, the remote server 104 may know the general location of the mobile wireless device 100 and use this information to access the device identifier of the controllable device 102. The mobile wireless device 100 may use the received device identifier to find the device 102 locally. In the alternate example embodiment, the mobile wireless device 100 may also receive a user interface 141 and connectivity data from the remote server 104, as shown in FIG. 1C. The mobile wireless device 100 may find the device 102 locally and start communicating with the device 102 based on the received information.

In example embodiments of the invention, the wireless mobile device 100 and the controllable device 102 may include a processor 122 that includes from one to many central processing units (CPUs) 124, a random access memory (RAM), a read only memory (ROM), a Received Signal Strength Indication (RSSI) to distance conversion module 129, and interface circuits to interface with one or more radio transceivers 116, antenna 132, 170, and battery or house power sources. The wireless mobile device 100 also includes cell phone circuits 131 and is connectible to the Internet. The controllable device 102 may optionally include cell phone circuits 131 and is connectible to the Internet. A smart phone may include a keypad, display 145, etc. A wireless controllable device may include a display device 145 and/or a speaker. The RAM and ROM can be removable memory devices 126 such as smart cards, SIMs, WIMs, semiconductor memories such as RAM, ROM, PROMS, flash memory devices, etc., as shown in FIG. 3. In an example embodiment of the invention, the RAM in the mobile wireless device 100 may store information contained in received advertising messages 150, for example, a description of the capabilities of the sending controllable device 102 in received advertising messages 150.

In an example embodiment of the invention, the mobile wireless device 100 and the wireless controllable device 102 include a Bluetooth™ Low Energy protocol (BTLE) 114 module. The mobile wireless device 100 may include a WLAN communications protocol 115 module, such as the IEEE 802.11 communications protocol. The controllable device 102 may optionally include a WLAN communications protocol 115 module. The controllable device 102 may optionally include an access authorization module 113.

In an example embodiment of the invention, the mobile wireless device 100 determines proximity to the wireless controllable device 102 by receiving at least an address of the controllable device 102. The mobile wireless device 100 measures the RSSI signal strength of the one or more received BTLE wireless messages 150. The mobile wireless device 100 determines whether it is in close proximity to the controllable device 102, based on the measured RSSI signal strength of the one or more received BTLE wireless messages 150.

In an example embodiment of the invention, the mobile wireless device 100 may be, for example, a miniature device such as a key fob, smart card, jewelry, or the like. In an example embodiment of the invention, the mobile wireless device 100 may be, for example, a relatively larger cell phone, smart phone, flip-phone, PDA, graphic pad. The mobile wireless device 100 may also be in an automobile or other vehicle. In embodiments, the relative sizes of devices 100 and 102 may be arbitrary.

FIG. 2B is an illustration of an example embodiment of the network of FIG. 2A, wherein the user function to be performed is mechanical service/repair. When the mobile wireless device 100 detects proximity to the pump XYZ, the mobile wireless device transmits to the cloud server, a message 160 requesting a user interface corresponding to a user function to be performed with the mobile wireless device 100, the request message containing information including at least a user identifier, an indication of characteristics of the mobile wireless device 100 and an indication relating to an address of the controllable device, the pump XYZ 102.

In example embodiments of the invention, the request message 160 may be a WLAN message (shown in FIG. 5B), a cell phone message or messages over the Internet, such as HTTP request over Transport Layer Security (TLS) connection. The request message 160 may contain information including some or all of the following: its ID, a user identifier, user function: mechanical service/repair, display type: screen's parameters, location: lat/lon; factory floor; pump room, controllable device id: pump XYZ, and its request for the user interface: mechanical service panel. The user identifier may be for example, account information (for example a Google account, Apple ID, MS live account, Nokia account, etc). To maintain security, the mobile wireless device 100 may be required to submit access authorization credentials to the cloud server 104, showing authorization to securely access the controllable device 102.

In example embodiments of the invention, the cloud server 104 receives the request message 160. The cloud server 104 may compose information based on the information received by the server 104 in the request message 160.

The information composed by the server 104 may include connectivity information to enable the requesting mobile wireless device 100 to communicate with the controllable device 102 and information suitable for compiling a user interface 141 including parameters enabling controlling of the controllable device 102.

In an example embodiment of the invention, the connectivity information may include communications protocol information and/or metadata to enable the mobile wireless device 100 communicate with the controllable device 102. The metadata may include, for example, service and/or characteristics UUIDs of the Bluetooth LE protocol or other information related to services in the controllable device 102.

In example embodiments of the invention, mobile wireless device 100 may compile the user interface 141 including the received parameters enabling at least one of controlling and monitoring of the controllable device 102. The information for compiling a user interface may be composed of HTML, HTML5, CSS, JavaScript, ECMAScript, Java, or code written in some other language.

In other example embodiments of the invention, the server may compose the user interface 141 based on the information received by the server in the request message 160, the user interface 141 including parameters characterizing the requesting wireless device 100.

In example embodiments of the invention, the mobile wireless device 100 may compose a user interface corresponding to the user function to be performed. The cloud server 104 accesses the mapping database 106 to obtain data describing the requested user interface corresponding to the user function to be performed. The database 106 contains data describing user interfaces 141 and 142 for a variety of controlled device types and mobile device display types.

In an example use case, Mechanic Mike is providing service to the pump system. Mike enters the control room and Mike's mobile wireless device (phone or tablet) is able to detect IDs coming from the pump and valve. The mobile wireless device may know, based on the received ID, which devices are proximate, or the ID may be a random number not providing any insight to the actual device. Mike's mobile wireless device may also know Mike's identity and some characteristics of the mobile wireless device, itself, (such as operating system, screen size and resolution). With this information and possible location information, the mobile wireless device may contact the cloud server to provide this collected information to the server. In response, the cloud server may use this information to compose an appropriate user interface, based on the information provided by the mobile wireless device. The user interface may be composed to correspond to the user, the user's device, the location, or the detected controllable device's ID. The cloud server will return an appropriate user interface to the user's device, possibly together with some connectivity information as to how to access the controllable device.

Two different user interfaces are shown in the database 106. The first user interface 141 is provided to mechanic Mike, corresponding a profile for performing mechanical service/repair. The second user interface 142 is for electrician Einstein, who has a profile to perform electrical service/repair. Mike's and Einstein's mobile wireless devices have the same software, only the user interface and possibly the connectivity control messages are different. Einstein can use Mike's device to perform electrical service work.

In example embodiments of the invention, the cloud server 104 may include a processor 122 that includes from one to many central processing units (CPUs) 124, a random access memory (RAM) and a read only memory (ROM) 126, and interface circuits to interface with one or more radio transceivers 116, antenna 172, and battery or house power sources. The server 104 may also include cell phone circuits 131. The RAM and ROM can be removable memory devices 126 such as smart cards, SIMs, WIMs, semiconductor memories such as RAM, ROM, PROMS, flash memory devices, etc., as shown in FIG. 3. In an example embodiment of the invention, the RAM in the server 104 may store information contained in received messages 160. In an example embodiment of the invention, the server 104 may include a WLAN communications protocol, such as the IEEE 802.11 communications protocol.

In example embodiments of the invention, the cloud server 104 may not necessarily have any radio or any cell phone circuits, as the cloud server may not necessarily have any understanding of cellular networks. The cloud server may simply be in a datacenter connected through wired internet access. Thus, any kind of communication technologies may be used for the cloud server. In example embodiments of the invention, the "cloud server" may be quite local to the mobile device, and hence it may directly have radio access.

FIG. 2C is an illustration of an example embodiment of the network of FIG. 2B, wherein the cloud server 104 uses the information received in request message 160 from the mobile wireless device 100, to access from a mapping database 106, data describing a mechanical service panel user interface 141 that is appropriate for the specified type of controlled device 102. The cloud server 104 accesses data describing the mechanical service panel 141 corresponding to the user function of mechanical service/repair. The cloud server 104 optionally accesses connectivity information from a connectivity database 108, to obtain communications protocol information and metadata to enable the mobile wireless device 100 communicate with the controllable device 102. The cloud server 104 may provide the compiled user interface 141 to the mobile wireless device 100, to enable a user of the mobile wireless device 100 to perform the user function of at least one of monitoring and controlling the wireless controllable device.

In example embodiments of the invention, the cloud server composes the user interface for the mechanical service panel 141, based on the accessed data, including display parameters for the mobile wireless device 100, such as a required aspect ratio, resolution, and color palette, and a required communications protocol for the mobile wireless device 100 to communicate with the controllable device 102. The cloud server 104 formats the accessed user interface 141 for display on the specified type of display 145 of the mobile wireless device 100. The cloud server 104 may send to the mobile wireless device 100, a message for example over a WLAN or cellular connection, 162 (shown in FIG. 5C) containing the formatted user interface: mechanical service panel 141. The cloud server sends the user interface and the connectivity data in a message for example over a WLAN or cellular connection via the Internet to the mobile wireless device.

FIG. 2D is an illustration of an example embodiment of the network of FIG. 2C, wherein the user of the mobile wireless device 100 has used the mechanical service panel user interface 141 displayed, to monitor and/or control the controllable device 102, by sending a mechanical control message 164 to the controllable device 102. The message 164 is transmitted by the mobile wireless device 100 to the controllable device 102 using the communications format specified in message 162 by the cloud server 104, such as BTLE. Example functions displayed on the mechanical service panel user interface 141 may include a display of pump pressure, pump hours, and valve travel. The mechanical service panel user interface 141 may control the pump on and off switch.

In example embodiments of the invention, the mobile wireless device 100 may optionally report back to the server 104, the actions that the user has performed with the controlled device 102, so that the server 104 may log the actions for further use or analysis.

FIG. 2E is an illustration of an example embodiment of the network of FIG. 2A, wherein the user function to be performed is electrical service/repair. When the mobile wireless device 100 detects proximity to the pump XYZ, the mobile wireless device sends to the cloud server, a message for example over a WLAN or cellular connection, 160 (shown in FIG. 5B). The mobile wireless device 100 is shown sending to the cloud server 104, a message for example over a WLAN or cellular connection, 160 containing information including some or all of its ID, a user identifier, user function: electrical service/repair, display type: screen's parameters, location: lat/lon; factory floor; pump room, controllable device ID: pump XYZ, and its request for the user interface: electrical service panel.

FIG. 2F is an illustration of an example embodiment of the network of FIG. 2E, wherein the cloud server 104 uses the information received from the mobile wireless device 100, to access from a mapping database 106, data describing an electrical service panel user interface 142 that characterizes the specified type of controlled device 102. The cloud server formats the electrical service panel user interface 142 for display on the specified type of display 145 of the mobile wireless device 100. The cloud server may access the connectivity database 108 to obtain connectivity information, for communication with the controllable device. Connectivity information is used for connection with the controllable device 102, but it may not necessarily be needed with an existing Internet connection.

FIG. 2G is an illustration of an example embodiment of the network of FIG. 2F, wherein the user of the mobile wireless device 100 used the electrical service panel user interface 142 displayed on the display 145, to monitor and/or control the controllable device 102. Example functions displayed in the electrical service panel user interface 142 may include a display of control voltage and drive voltage. Control functions may include pump on/off, valve on/off, and restart control circuit. The control functions may be performed by sending a BTLE electrical control message 164 to the controllable device 102.

FIG. 3 illustrates an example embodiment of the invention, wherein examples of removable storage media 126 are shown, based on magnetic, electronic and/or optical technologies, such as magnetic disks, optical disks, semiconductor memory circuit devices and micro-SD memory cards (SD refers to the Secure Digital standard) for storing data and/or computer program code as an example computer program product, in accordance with at least one embodiment of the present invention.

3. The Group of FIGS. 4A to 4D Illustrates an Example Extension of the Example Embodiment Shown in the Group of FIGS. 2A to 2G, Wherein the User Interface is Preloaded into a Cache of the Mobile Wireless Device from the Server, to Enable Offline Use of the User Interfaces, which are Invoked Only when a Corresponding Controllable Device is Detected to be in Proximity. The Offline Use May be Enabled on a Per User, Per Area, Per Controllable Device, or Per Time, Basis.

FIG. 4A is an illustration of an example embodiment of the network of FIG. 2B, wherein the mobile wireless device 100 is shown sending to the cloud server 102, a WLAN or a cell phone request message 161 requesting preloading of user interfaces characterizing controllable devices in the current area of mobile wireless device 100, formatted for display on mobile wireless device 100. To maintain security, the mobile wireless device 100 may be required to submit access authorization credentials to the cloud server 104, showing authorization to securely access the controllable devices 102 in its area.

The cloud server 104 uses the information received from the mobile wireless device 100, to access from the mapping database 106, data describing appropriate user interfaces corresponding to controlled devices in the current area of the mobile wireless device 100. The cloud server 104 may access the connectivity database 108 to obtain connectivity information, to obtain communications protocol information and metadata to enable the mobile wireless device 100 communicate with the controllable device 102, in accordance with at least one embodiment of the present invention. The cloud server 104 composes the user interfaces 141 and 142, based on the accessed data, including display parameters for the mobile wireless device 100, such as a required aspect ratio, resolution, and color palette, and a required communications protocol for the mobile wireless device 100 to communicate with the controllable device 102.

The figure shows the cloud server 104 responding with a reply message 162 including the requested user interfaces 141 and 142 characterizing a controllable device, the pump XYZ, in the area of the mobile wireless device 100, formatted for display on the mobile wireless device. The requested user interfaces 141 and 142 for the pump XYZ are preloaded into a cache 155 in the mobile wireless device 100, in accordance with at least one embodiment of the present invention.

FIG. 4B is an illustration of an example embodiment of the network of FIG. 3, wherein the mechanical service panel 141 is displayed as a user interface for the pump XYZ when the mobile device is near to a distance X1 from the pump. An electrical service panel 142 is displayed as a user interface for the pump XYZ when the mobile device is near to a distance X2 from the pump, in accordance with at least one embodiment of the present invention.

FIG. 4C is an illustration of an example embodiment of the network of FIG. 4B, wherein the mobile wireless device 100 has moved closer at a distance X1 to the pump. The mobile wireless device is shown accessing the mechanical service panel 141 from its cache 155 for display as a user interface for the pump, when the mobile device is near to a distance X1 from the pump, in accordance with at least one embodiment of the present invention.

FIG. 4D is an illustration of an example embodiment of the network of FIG. 4B, wherein the mobile wireless device 100 has moved closer at a distance X2 to the pump. The mobile wireless device is shown accessing the electrical service panel 142 from its cache 155 for display as a user interface for the pump, when the mobile device is near to a distance X2 from the pump, in accordance with at least one embodiment of the present invention. The preloaded user interfaces in cache 155 of the mobile wireless device, enables offline use of the user interfaces. Individual ones of the user interfaces in the cache may be invoked when a corresponding controllable device is detected to be in proximity. Offline use may be enabled on a per user, per area, per controllable device, or per time basis. When this is enabled, the mobile device may refresh all offline user interfaces when it is connected to a network, such as the internet.

In an example embodiment of the invention, the mechanic Mike's mobile wireless device sends a request message 161 to the server, requesting the necessary user interfaces that are then preloaded or stored in Mike's mobile wireless device. The request message 161 need only contain Mike's user identifier. The server may validate the request message and then respond with the corresponding user interfaces that may then be preloaded into the cache in Mike's mobile wireless device. In addition, the request message may optionally include an indication of characteristics of Mike's mobile wireless device.

Other examples of controllable devices 102 may include healthcare and medical equipment in a hospital or similar setting, as previously discussed. When a nurse or physician arrives on duty and logs in to the hospital's network, their mobile wireless device sends information to the server that can provide the necessary user interfaces that are then preloaded or stored in the to the mobile wireless device. The login request message 161 need only contain a user identifier of the nurse or physician. The server may validate the login request message 161 and then respond with the corresponding user interfaces that may then be preloaded into the cache in the mobile wireless device. In addition, the login request message may optionally include an indication of characteristics of the mobile wireless device, to provide a distinction between a phone or a tablet, for example. The data provided by the server may be preloaded into the nurse's and physician's mobile wireless devices when they arrive on duty, since the nurses and physicians typically have certain responsibility areas, such as a specific ward where their patients and the medical equipment are located.

Security of the example embodiment shown in the group of FIGS. 4A to 4D, may be enhanced by first performing the example embodiment shown in the group of FIGS. 1 to 1G, to make the user interface control concept more secure.

FIG. 5A is an illustration of an example format for the Bluetooth™ Low Energy protocol (BTLE) advertising messages 150, in accordance with at least one embodiment of the present invention. The format of Advertising data and Scan Response data consists of a significant part and a non-significant part. The significant part contains a sequence of AD structures. Each AD structure shall have a Length field of one octet, which contains the Length value, and a Data field of Length octets. The first octet of the Data field contains the AD type field. The content of the remaining Length—1 octet in the Data field depends on the value of the AD type field and is called the AD data. The non-significant part extends the Advertising and Scan Response data to 31 octets and shall contain all-zero octets.

FIG. 5B is an illustration of an example simplified format for a WLAN message 160 sent by the mobile wireless device 100 to the cloud server 104, requesting the user interface: mechanical service panel. The example WLAN message 160 is an IEEE 802.11 data frame carrying an example data payload of some or all of:

Mobile device address/ID, a user identifier,
USER FUNCTION: mechanical service/repair
DISPLAY TYPE: screen's parameters
Location: lat/lon; factory floor; pump room
Controllable device id: pump xyz
User interface: MECHANICAL SERVICE panel In example embodiments of the invention, the request message 160 may be a WLAN message, a cell phone message or messages over the Internet, such as HTTP request over Transport Layer Security (TLS) connection.

FIG. 5C is an illustration of an example simplified format for a WLAN message 162 sent by the cloud server 104 to the mobile wireless device 100, with the user interface: mechanical service panel. The example WLAN message 1620 is an IEEE 802.11 data frame carrying an example data payload of the user interface characterizing controllable device 102 formatted for display on device 100.

In example embodiments of the invention, the reply message 162 may be a WLAN message, a cell phone message or messages over the Internet, such as HTTP request over Transport Layer Security (TLS) connection.

FIG. 6 is an illustration of an example flow diagram of an example process in the cloud server 104, carrying out the example operations, in accordance with at least one embodiment of the present invention.

Step 602 detects the device ID of the mobile wireless device 100, the user ID, the user device ID, and the location of the controllable device 102.

Step 604 selects the user interface by accessing the mapping database 106.

Step 606 access the connectivity information from the connectivity database 108.

Step 608 provides the selected user interface to the requesting mobile wireless device 100.

Server gets detected device ID, user ID, user device ID, location information (or some of those). Server gets U/I from mapping database, which is providing predefined U/I for certain combination of user, device etc. IDs. Next server gets related connectivity information, i.e. how to use connectivity and remote device based on UI.

FIG. 7A is an illustration of an example flow diagram 700 of an example process in the mobile wireless device 100, carrying out the example operations, in accordance with at least one embodiment of the present invention. The steps of the flow diagram represent computer code instructions stored in the RAM and/or ROM memory of the device, which when executed by the central processing units (CPU) 124, carry out the functions of the example embodiments of the invention. The steps may be carried out in another order than shown and individual steps may be combined or separated into component steps. The flow diagram has the following steps:

Step 702: receiving, by an apparatus, an identifier associated with a device;

Step 704: transmitting, by the apparatus, a message to a remote server, requesting a user interface corresponding to a user function to be performed with the apparatus, the request message containing information including at least one of a user identifier, an indication of characteristics of the apparatus and an indication relating to the received identifier of the device;

Step 706: receiving, by the apparatus, from the server, information composed by the server based on the information transmitted to the server in the request message, the information received from the server including at least information suitable for compiling a user interface including parameters enabling at least one of controlling and monitoring of the device; and Step 708: providing, by the apparatus, a user interface compiled based on the received information, to enable a user of the apparatus to perform the user function of at least one of monitoring and controlling the device.

FIG. 7B is an illustration of an example flow diagram 750 of an example process in the cloud server 104, carrying out the example operations, in accordance with at least one embodiment of the present invention. The steps of the flow diagram represent computer code instructions stored in the RAM and/or ROM memory of the device, which when executed by the central processing units (CPU) 124, carry out the functions of the example embodiments of the invention. The steps may be carried out in another order than shown and individual steps may be combined or separated into component steps. The flow diagram has the following steps:

Step 752: receiving, by a server, a message from a requesting wireless device, requesting a user interface corresponding to a user function to be performed by the requesting wireless device, the request message containing information including at least one of a user identifier, an indication of characteristics of the requesting wireless device and an indication relating to an address of another device that is to be monitored or controlled by the requesting wireless device using the requested user interface;

Step 754: accessing, by the server, a database to obtain data relating to the requested user interface;

Step 756: composing, by the server, information based on the information received by the server in the request message, the information composed by the server including at least information suitable for compiling a user interface including parameters enabling at least one of controlling and monitoring of the other device; and Step 758: transmitting, by the server to the requesting wireless device, the information composed by the server.

Example embodiments of the invention are easy to use and the customized user interface may be provided for different users of a mobile wireless device. The controlled device's durability is increased via simpler hardware (no need for fancy displays, no need for so many buttons etc.). Access is allowed for hard to reach devices, such as things inside walls or high, or low, or otherwise difficult places. Security is increased by not making it possible to control device just by getting physical access to device. The user interface may be changed long after device has been deployed (e.g. after more experience on key functions and ways of use of a device, a vendor can make an easier-to-user version, or add missing ways to use a device). The user interface may be adapted and modified all the time to meet the new requirements or to enable more efficient usage for the existing users.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable non-transitory media such as resident memory devices, smart cards or other removable memory devices, thereby making a computer program product or article of manufacture according to the embodiments.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes can be made to the specific example embodiments without departing from the spirit and scope of the invention.

What is claimed is:

1. A method, comprising:
updating, by a server, a current location of a wireless device;
accessing, by the server, a database to obtain data relating to available devices near the current location, the data including a first encryption key and a second encryption key of at least one device near the current location, and a user access profile of the wireless device;
computing, by the server, an encrypted object formed by the first encryption key encrypting at least the user access profile of the wireless device; and
transmitting, by the server, to the wireless device, a message in response to the update, the message including information about the at least one device, including at least the second encryption key and the encrypted object.

2. The method of claim 1, further comprising:
receiving, by the server, from the wireless device, an update message over a secure channel, containing an update of a current location of the wireless device and a request for available devices near the current location.

3. The method of claim 1, further comprising:
receiving, by the server, a message from the wireless device, requesting a user interface corresponding to a user function to be performed by the wireless device, the request message containing information including at least a user identifier, an indication of characteristics of the wireless device and an indication relating to an address of another device that is to be monitored or controlled by the wireless device using the requested user interface;
accessing, by the server, a database to obtain data relating to the requested user interface;
composing, by the server, information based on the information received by the server in the request message, the information composed by the server including at least information suitable for compiling a user interface including parameters enabling controlling of the other device; and
transmitting, by the server to the wireless device, the information composed by the server.

4. The method of claim 3, further comprising:
composing, by the server, a user interface based on the information received by the server in the request message, the user interface including parameters characterizing the wireless device; and
transmitting, by the server to the wireless device, the user interface composed by the server.

5. An apparatus comprising:
at least one processor;
at least one memory including computer program code;
the at least one memory and the computer program code configured to, with the at least one processor, cause the apparatus at least to:
update a current location of a wireless device;
access a database to obtain data relating to available devices near the current location, the data including a first encryption key and a second encryption key of at least one device near the current location, and a user access profile of the wireless device;
compute an encrypted object formed by the first encryption key encrypting at least the user access profile of the wireless device; and
transmit to the wireless device, a message in response to the update, the message including information about the at least one device, including at least the second encryption key and the encrypted object.

6. The apparatus of claim 5, further comprising:
receive from the wireless device, an update message over a secure channel, containing an update of a current location of the wireless device and a request for available devices near the current location.

7. A computer program product comprising computer executable program code recorded on a computer readable, non-transitory storage medium, the computer executable program code comprising:
code for receiving, by a server, from a wireless device, an update message over a secure channel, containing an update of a current location of the wireless device and a request for available devices near the current location;
code for accessing, by the server, a database to obtain data relating to available devices near the current location, in response to the update message, the data including a first encryption key and a second encryption key of at least one device near the current location, and a user access profile of the wireless device;
code for computing, by the server, an encrypted object formed by the first encryption key encrypting at least the user access profile of the wireless device; and
code for transmitting, by the server, to the wireless device, a message in response to the update message, the message including information about the at least one device, including at least the second encryption key and the encrypted object.

* * * * *